(12) United States Patent
Akl et al.

(10) Patent No.: US 11,751,218 B2
(45) Date of Patent: Sep. 5, 2023

(54) RESOURCE CONFIGURATION FOR INTEGRATED ACCESS AND BACKHAUL RADIO ACCESS NETWORK SHARING

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 17/447,544

(22) Filed: Sep. 13, 2021

(65) Prior Publication Data

US 2022/0086829 A1 Mar. 17, 2022

Related U.S. Application Data

(60) Provisional application No. 62/706,855, filed on Sep. 14, 2020, provisional application No. 62/706,856, filed on Sep. 14, 2020.

(51) Int. Cl.
*H04W 72/27* (2023.01)
*H04W 72/0446* (2023.01)
(Continued)

(52) U.S. Cl.
CPC .......... *H04W 72/27* (2023.01); *H04L 5/1469* (2013.01); *H04W 72/0446* (2013.01);
(Continued)

(58) Field of Classification Search
CPC ............. H04W 72/27; H04W 72/0446; H04W 72/1263; H04W 72/52; H04W 88/14; H04L 5/1469
See application file for complete search history.

(56) References Cited

U.S. PATENT DOCUMENTS

2019/0380128 A1\* 12/2019 Park ...................... H04W 48/08
2021/0352666 A1\* 11/2021 Sirotkin ............ H04W 72/0446
(Continued)

FOREIGN PATENT DOCUMENTS

WO WO-2022011496 A1 \* 1/2022

OTHER PUBLICATIONS

Ericsson: "IAB Enhancements to Resource Multiplexing," 3GPP Draft, 3GPP TSG-RAN WG1 Meeting #102e, R1-2006903, 3rd Generation Partnership Project (3GPP), Mobile Competence Centre, 650, Route Des Lucioles, F-06921, Sophia-Antipolis Cedex, France, vol. RAN WG1. No. e-Meeting, Aug. 17, 2020-Aug. 28, 2020, Aug. 7, 2020 (Aug. 7, 2020), XP051915525, 8 pages, Retrieved from the Internet: URL: https://ftp.3gpp.org/tsg_ran/WG1_RL1/TSGR1_102-e/Docs/R1-2006903.zip R1-2006903 IAB enhancements to resource multiplexing.docx [retrieved on Aug. 7, 2020] Proposal 8.

(Continued)

Primary Examiner — Chae S Lee
(74) Attorney, Agent, or Firm — Arun Swain

(57) ABSTRACT

Various aspects of the present disclosure generally relate to wireless communication. In some aspects, a network node may transmit, to first central unit (CU) that corresponds to an integrated access and backhaul (IAB) donor, an indication of a first resource configuration for communications corresponding to a cell served by the network node and associated with a second CU that corresponds to a base station. The network node may receive, from the first CU, a (Continued)

second resource configuration comprising a distributed unit (DU) cell resource configuration for the cell. Numerous other aspects are described.

30 Claims, 16 Drawing Sheets

(51) Int. Cl.
  *H04W 88/14* (2009.01)
  *H04W 72/1263* (2023.01)
  *H04L 5/14* (2006.01)
  *H04W 72/52* (2023.01)
(52) U.S. Cl.
  CPC ....... *H04W 72/1263* (2013.01); *H04W 72/52* (2023.01); *H04W 88/14* (2013.01)

(56) References Cited

U.S. PATENT DOCUMENTS

| | | | |
|---|---|---|---|
| 2022/0015093 A1* | 1/2022 | Ying | H04W 72/0446 |
| 2022/0086695 A1* | 3/2022 | Akl | H04L 41/0823 |
| 2022/0095283 A1* | 3/2022 | Wei | H04L 5/0003 |

OTHER PUBLICATIONS

Intel Corporation: "Enhancements to Resource Multiplexing Between Child and Parent Links of an IAB Node," 3GPP Draft, 3GPP TSG RAN WG1 #102-e, R1-2005893, 3rd Generation Partnership Project (3GPP), Mobile Competence Centre, 650, Route Des Lucioles, F-06921, Sophia-Antipolis Cedex, France, vol. RAN WG1, No. e-meeting, Aug. 17, 2020-Aug. 28, 2020, Aug. 8, 2020 (Aug. 8, 2020), XP051917795, 7 pages, Retrieved from the Internet: URL: https://ftp.3gpp.org/tsg_ran/WG1_RL1/TSGR1_102-e/Docs/R1-2005893.zip [retrieved on Aug. 8, 2020], paragraph [0004].
International Search Report and Written Opinion—PCT/US2021/071455—ISA/EPO—dated Dec. 6, 2021.
Nokia, et al., "Enhancements for Resource Multiplexing Among IAB Backhaul and Access Links," 3GPP Draft, 3GPP TSG RAN WG1 #102-e, R1-2005535, 3rd Generation Partnership Project (3GPP), Mobile Competence Centre, 650, Route Des Lucioles, F-06921, Sophia-Antipolis Cedex, France, vol. RAN WG1, No. E-Meeting, Aug. 17, 2020-Aug. 28, 2020, Aug. 7, 2020 (Aug. 7, 2020), XP051914973, 4 pages, Retrieved from the Internet: URL: https://ftp.3gpp.org/tsg_ran/WG1_RL1/TSGR1_102-e/Docs/R1-2005535.zip R1-2005535_Resource Multiplexing. Docx [retrieved on Aug. 7, 2020], paragraph [0003].
Nokia, et al., "Mechanisms for Resource Multiplexing Among Backhaul and Access Links", 3GPP draft, 3GPP TSG RAN WG1 Meeting #98, R1-1908987 IAB Resource Allocation, 3rd Generation Partnership Project (3GPP), Mobile Competence Centre, 650, Route Des Lucioles, F-06921, Sophia-Antipolis Cedex, France, vol. RAN WG1. No. Prague. Czech Republic, Aug. 26, 2019-Aug. 30, 2019, Aug. 16, 2019 (Aug. 16, 2019), XP051765591, 20 pages, Retrieved from the Internet: URL: http://www.3gpp.org/ftp/tsg_ran/WG1_RL1/TSGR1_98/Docs/R1-1908987.zip [retrieved on Aug. 16, 2019] Proposal 2.
ZTE, et al., "Discussion on the Intra-Frequency NR DC Operation for IAB", 3GPP Draft, 3GPP TSG RAN Meeting #89e, RP-201772, 3rd Generation Partnership Project (3GPP), Mobile Competence Centre, 650, Route Des Lucioles, F-06921, Sophia-Antipolis Cedex, France, vol. TSG RAN. No. Electronic Meeting, Sep. 14, 2020-Sep. 18, 2020, Sep. 7, 2020 (Sep. 7, 2020), XP051931571, 4 pages, Retrieved from the Internet: URL: https://ftp.3gpp.org/tsg_ran/TSG_RAN/TSGR_89e/Docs/RP-201772.zip RP-201772 Discussion on the Intra-Frequency NR DC Operation for IAB.doc [retrieved on Sep. 7, 2020], p. 2, last paragraph, p. 3, last paragraph, figure 3.

\* cited by examiner

RESOURCE CONFIGURATION FOR INTEGRATED ACCESS AND BACKHAUL RADIO ACCESS NETWORK SHARING

CROSS-REFERENCE TO RELATED APPLICATION

This patent application claims priority to U.S. Provisional Patent Application No. 62/706,856, filed on Sep. 14, 2020, entitled "UPLINK AND DOWNLINK CONFIGURATION FOR INTEGRATED ACCESS AND BACKHAUL RADIO ACCESS NETWORK SHARING," and to U.S. Provisional Patent Application No. 62/706,855, filed on Sep. 14, 2020, entitled "RESOURCE CONFIGURATION FOR INTEGRATED ACCESS AND BACKHAUL RADIO ACCESS NETWORK SHARING," each of which is assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for resource configuration for integrated access and backhaul radio access network sharing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LIE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a network node includes transmitting, to first central unit (CU) that corresponds to an integrated access and backhaul (IAB) donor, an indication of a first resource configuration for communications corresponding to a cell served by the network node and associated with a second CU that corresponds to a base station; and receiving, from the first CU, a second resource configuration comprising a distributed unit (DU) cell resource configuration for the cell.

In some aspects, a method of wireless communication performed by a first CU associated with an IAB donor includes receiving, from an IAB node, an indication of a first resource configuration for communications corresponding to a cell served by the IAB node and associated with a second CU that corresponds to a base station; and transmitting, to the IAB node, a second resource configuration comprising a DU cell resource configuration for the cell.

In some aspects, a network node for wireless communication includes a memory; and one or more processors coupled to the memory, the one or more processors configured to: transmit, to a first CU that corresponds to an IAB donor, an indication of a first resource configuration for communications corresponding to a cell served by the network node and associated with a second CU that corresponds to a base station; and receive, from the first CU, a second resource configuration comprising a DU cell resource configuration for the cell.

In some aspects, a first CU for wireless communication includes a memory; and one or more processors coupled to the memory, the one or more processors configured to: receive, from an IAB node, an indication of a first resource configuration for communications corresponding to a cell served by the IAB node and associated with a second CU that corresponds to a base station; and transmit, to the IAB node, a second resource configuration comprising a DU cell resource configuration for the cell.

In some aspects, a non-transitory computer-readable medium storing a set of instructions for wireless communication includes one or more instructions that, when executed by one or more processors of a network node, cause the network node to: transmit, to a first CU that corresponds to an IAB donor, an indication of a first resource configuration for communications corresponding to a cell served by the network node and associated with a second CU that corresponds to a base station; and receive, from the first CU, a second resource configuration comprising a DU cell resource configuration for the cell.

In some aspects, a non-transitory computer-readable medium storing a set of instructions for wireless communication includes one or more instructions that, when executed by one or more processors of a first CU, cause the first CU to: receive, from an IAB node, an indication of a first resource configuration for communications corresponding to a cell served by the IAB node and associated with a second CU that corresponds to a base station; and transmit, to the IAB node, a second resource configuration comprising a DU cell resource configuration for the cell.

In some aspects, an apparatus for wireless communication includes means for transmitting, to a first CU that corresponds to an IAB donor, an indication of a first resource configuration for communications corresponding to a cell served by the apparatus and associated with a second CU that corresponds to a base station; and means for receiving, from the first CU, a second resource configuration comprising a DU cell resource configuration for the cell.

In some aspects, an apparatus for wireless communication includes means for receiving, from an IAB node, an indication of a first resource configuration for communications corresponding to a cell served by the IAB node and associated with a CU that corresponds to a base station; and means for transmitting, to the IAB node, a second resource configuration comprising a DU cell resource configuration for the cell.

In some aspects, a method of wireless communication performed by a network node includes receiving, from a first CU that corresponds to an IAB donor, an indication of a first DU cell resource configuration for communications corresponding to a cell served by the network node and associated with a second CU that corresponds to a base station; and transmitting, to the second CU, an indication of a second DU cell resource configuration based at least in part on the first DU cell resource configuration.

In some aspects, a method of wireless communication performed by a CU includes receiving, from an IAB node, an indication of a DU cell resource configuration for communications corresponding to a cell served by the IAB node and associated with the CU, wherein the CU corresponds to a base station; and transmitting an indication of a child-specific TDD configuration for a child node, wherein the child node is served on the cell, and wherein the child specific TDD configuration is based at least in part on the DU cell resource configuration.

In some aspects, a network node for wireless communication includes a memory; and one or more processors coupled to the memory, the memory and the one or more processors configured to: receive, from a first CU that corresponds to an IAB donor, an indication of a first DU cell resource configuration for communications corresponding to a cell served by the network node and associated with a second CU that corresponds to a base station; and transmit, to the second CU, an indication of a second DU cell resource configuration based at least in part on the first DU cell resource configuration.

In some aspects, a CU for wireless communication includes a memory; and one or more processors operatively coupled to the memory, the memory and the one or more processors configured to: receive, from an IAB node, an indication of a DU cell resource configuration for communications corresponding to a cell served by the IAB node and associated with the CU, wherein the CU corresponds to a base station; and transmit an indication of a child-specific TDD configuration for a child node, wherein the child node is served on the cell, and wherein the child specific TDD configuration is based at least in part on the DU cell resource configuration.

In some aspects, a non-transitory computer-readable medium storing a set of instructions for wireless communication includes one or more instructions that, when executed by one or more processors of a network node, cause the network node to: receive, from a first CU that corresponds to an IAB donor, an indication of a first DU cell resource configuration for communications corresponding to a cell served by the network node and associated with a second CU that corresponds to a base station; and transmit, to the second CU, an indication of a second DU cell resource configuration based at least in part on the first DU cell resource configuration.

In some aspects, a non-transitory computer-readable medium storing a set of instructions for wireless communication includes one or more instructions that, when executed by one or more processors of a CU, cause the CU to: receive, from an IAB node, an indication of a DU cell resource configuration for communications corresponding to a cell served by the IAB node and associated with the CU, wherein the CU corresponds to a base station; and transmit an indication of a child-specific TDD configuration for a child node, wherein the child node is served on the cell, and wherein the child specific TDD configuration is based at least in part on the DU cell resource configuration.

In some aspects, an apparatus for wireless communication includes means for receiving, from a first CU that corresponds to an IAB donor, an indication of a first DU cell resource configuration for communications corresponding to a cell served by the apparatus and associated with a second CU that corresponds to a base station; and means for transmitting, to the second CU, an indication of a second DU cell resource configuration based at least in part on the first DU cell resource configuration.

In some aspects, an apparatus for wireless communication includes means for receiving, from an IAB node, an indication of a DU cell resource configuration for communications corresponding to a cell served by the apparatus and associated with the CU, wherein the CU corresponds to a base station; and means for transmitting an indication of a child-specific TDD configuration for a child node, wherein the child node is served on the cell, and wherein the child specific TDD configuration is based at least in part on the DU cell resource configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
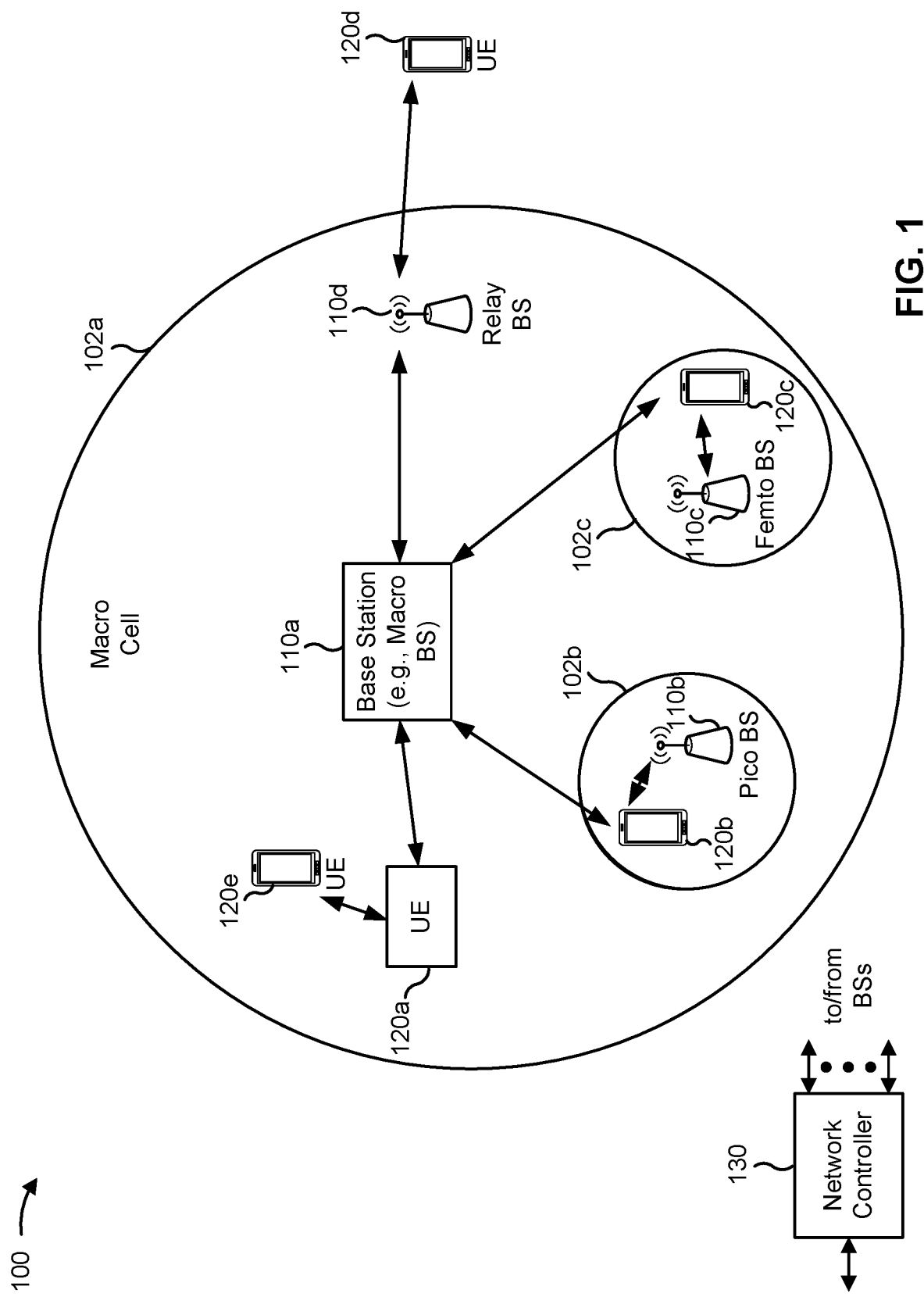
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LIE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
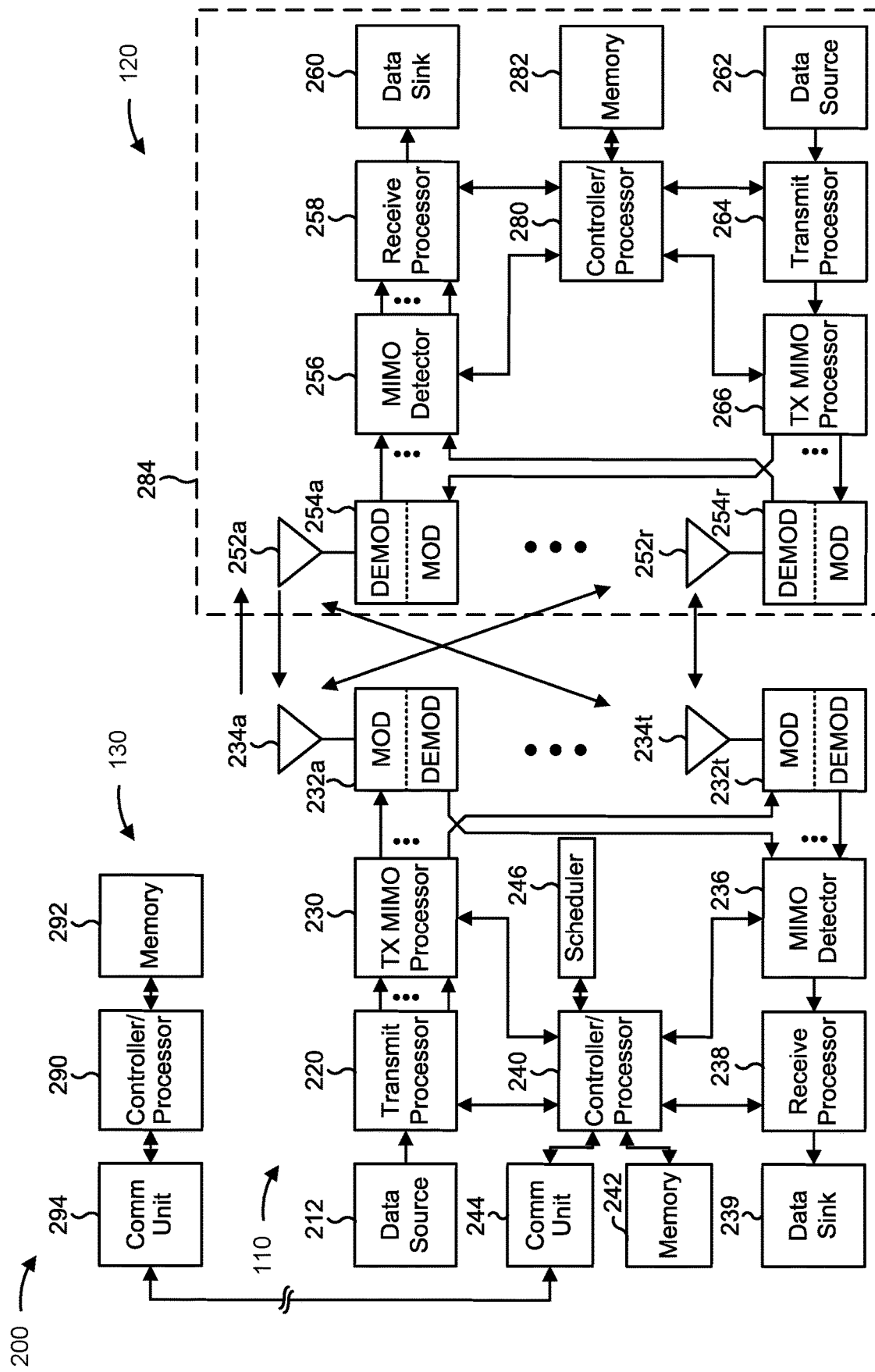
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure.

Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-16).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-16).

Controller/processor 240 of base station 110, controller/processor 280 of UE 120, and/or any other component(s) of FIG. 2 may perform one or more techniques associated with uplink and downlink resource configuration for integrated access and backhaul (IAB) radio access network (RAN) sharing, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, process 1400 of FIG. 14, and/or other processes as described herein. In some aspects, executing instructions may include running the instructions, converting the instructions, compiling the instructions, and/or interpreting the instructions, among other examples.

In some aspects, a base station 110 may include means for transmitting, to first central unit (CU) that corresponds to an IAB donor, an indication of a first resource configuration for communications corresponding to a cell served by the network node and associated with a second CU that corresponds to a base station, and means for receiving, from the first CU, a second resource configuration comprising a distributed unit (DU) cell resource configuration for the cell, among other examples. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a base station 110 may include means for receiving, from an IAB node, an indication of a first resource configuration for communications corresponding to a cell served by the IAB node and associated with a second CU that corresponds to a base station, and means for transmitting, to the IAB node, a second resource configuration comprising a DU cell resource configuration for the cell, among other examples. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
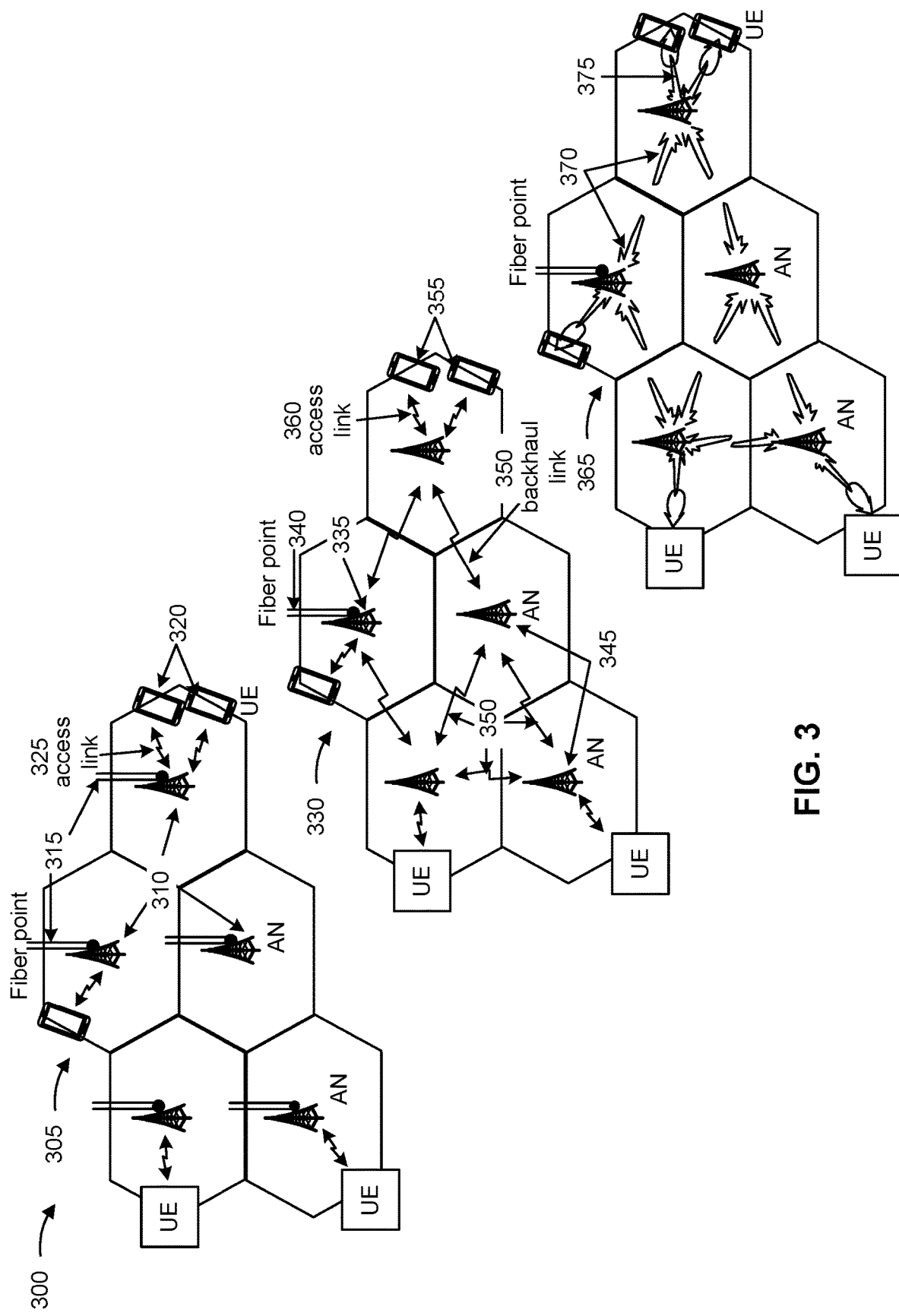
FIG. 3 is a diagram illustrating examples of radio access networks, in accordance with the disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
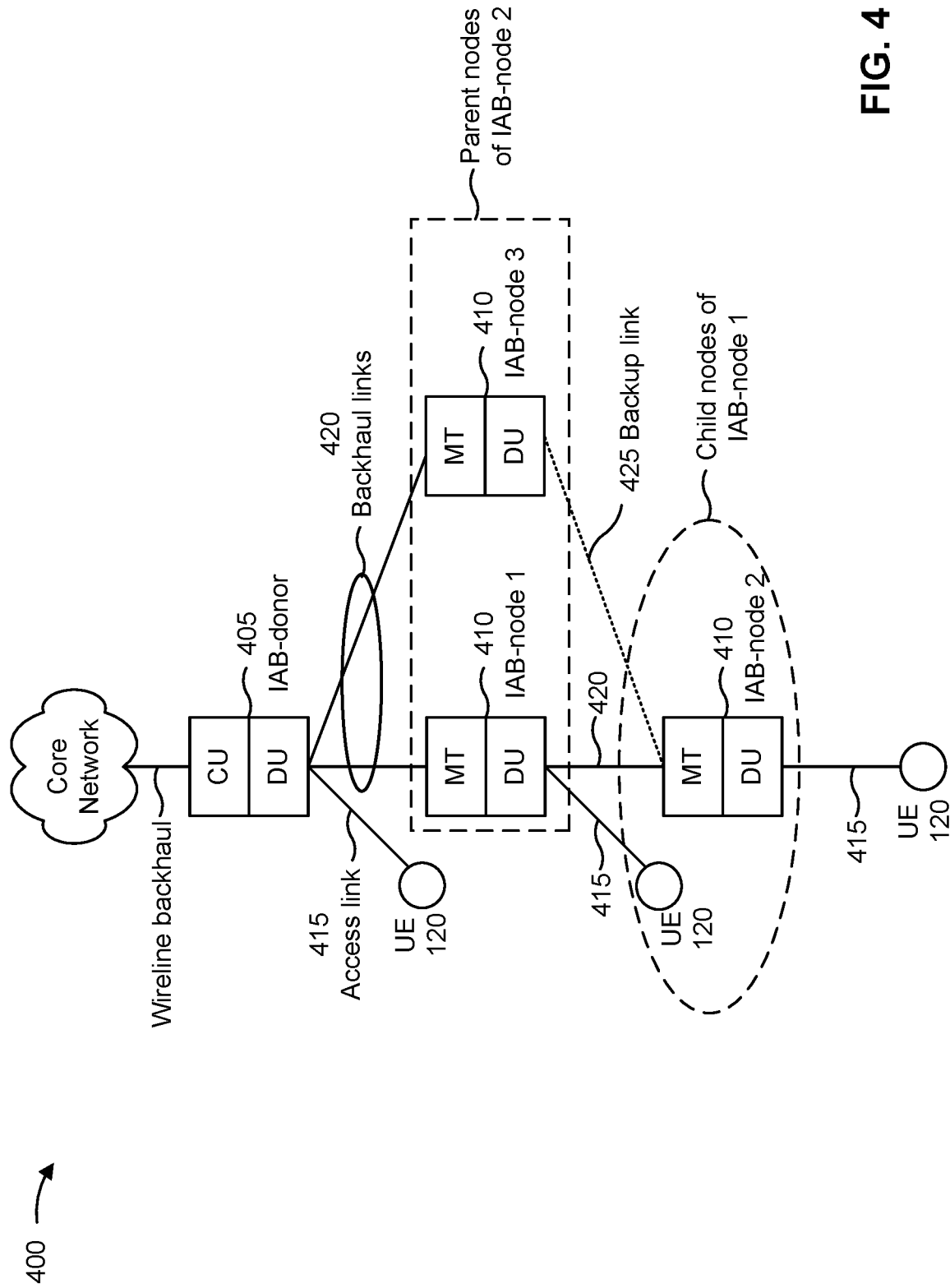
FIG. 4 is a diagram illustrating an example of an integrated access and backhaul (IAB) network architecture, in accordance with the disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface (e.g., a user plane interface between the NG-RAN node and the user plane function) of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with 3. As shown, an IAB donor 405 may include a CU, which may perform access node controller (ANC) functions and/or AMF functions. The CU may configure a DU of the IAB donor 405 and/or may configure one or more IAB nodes 410 (e.g., a mobile termination (MT)

and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message, and/or the like). An IAB node may function as a Layer 2 relay for traffic transported via an IAB network configured or managed by a CU.

A CU (whether associated with an IAB donor or a gNB) may perform RRC layer functions and packet data convergence protocol (PDCP) functions. A DU may act as a scheduling node that schedules child nodes of a network node associated with the DU. For example, the DU may perform radio link control (RLC), medium access control (MAC), and physical (PHY) layer functions.

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410.

As indicated above, FIG. 4 is provided as an example. Other examples may differ from what is described with regard to FIG. 4.

Figure 5:
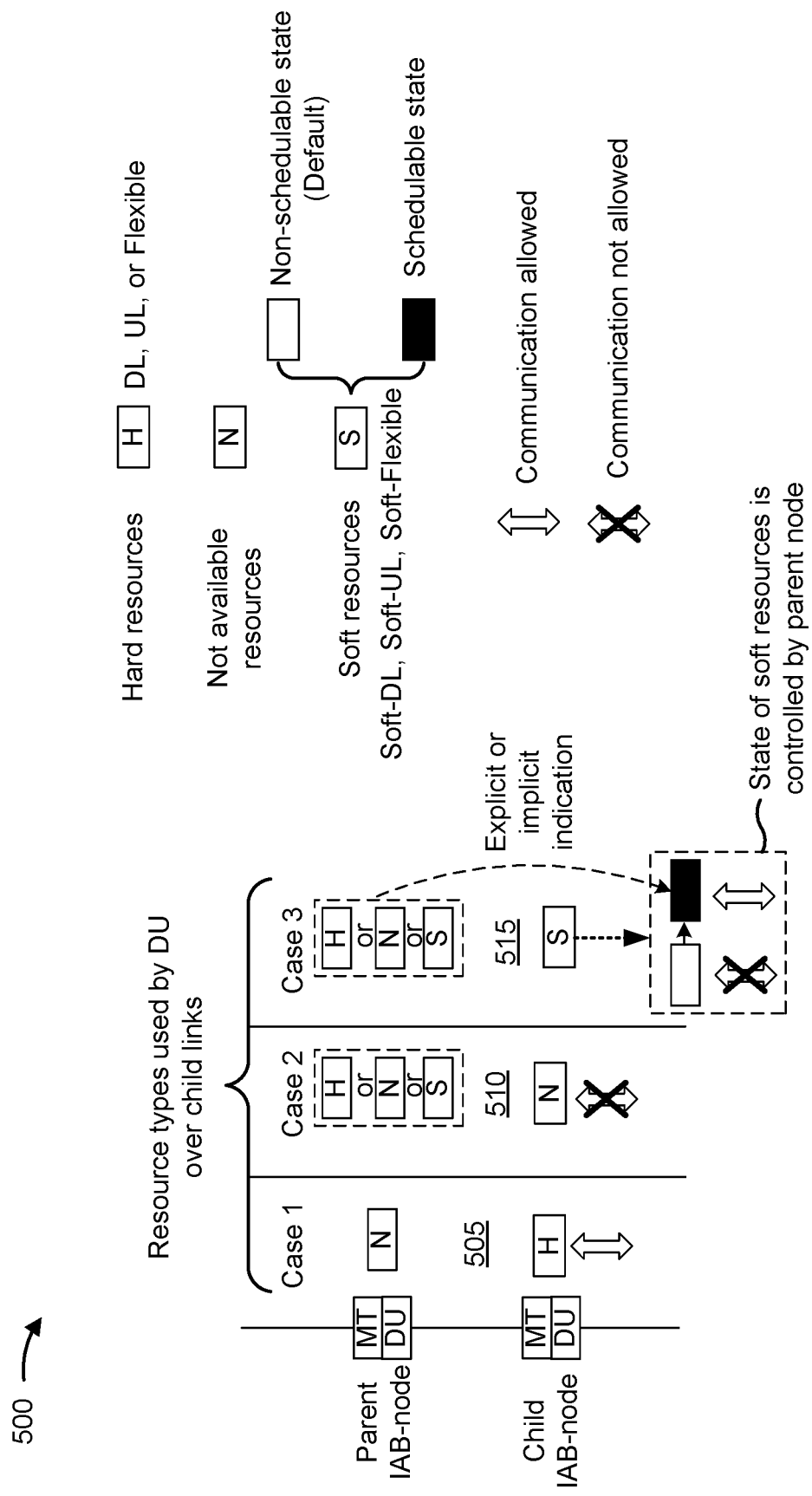
FIG. 5 is a diagram illustrating an example of resource types in an IAB network, in accordance with the disclosure.

FIG. 5 is a diagram illustrating an example 500 of resource types in an IAB network, in accordance with the disclosure.

In an IAB network, time domain resources (sometimes referred to as time resources) may be configured as downlink-only, uplink-only, flexible, or not available (e.g., NA, unavailable). For example, time domain resources may be configured via a DU cell resource configuration, such as a gNB-DU cell resource configuration, as described in more detail in connection with FIG. 6. When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Examples of downlink communications include synchronization signal blocks (SSBs) (both cell-defining SSBs (CD-SSBs) and non-CD-SSBs), channel state information reference signals (CSI-RS), physical downlink control channel (PDCCH) communications, physical downlink shared channel (PDSCH) communications, and/or the like. Examples of uplink communications include physical random access channel (PRACH) communications, physical uplink control channel (PUCCH) communications, physical uplink shared channel (PUSCH) communications, and/or sounding reference signals (SRS), among other examples.

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node. For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a non-schedulable state (e.g., when the soft time resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, and as shown by reference number 505, a time resource may be configured as hard for a child node, and the time resource may be configured as not available for a parent node of the child node. In this case, the parent node cannot communicate using that time resource, but the child node can schedule communications in that time resource and/or communicate using that time resource. This configuration may reduce interference between the parent node and the child node and/or may reduce scheduling conflicts between the parent node and the child node, among other examples.

As another example, and as shown by reference number 510, a time resource may be configured as not available for the child node, and may be configured as hard, soft, or not available for the parent node (e.g., depending on a network configuration, network conditions, and/or a configuration of a parent node of the parent node, among other examples). In this case, the child node cannot schedule communications in that time resource and cannot communicate using that time resource.

As another example, and as shown by reference number 515, a time resource may be configured as soft for the child node, and may be configured as hard, soft, or not available for the parent node (e.g., depending on a network configuration, network conditions, and/or a configuration of a parent node of the parent node, among other examples). In this case, the child node cannot schedule or communicate using the time resource unless the child node receives an indication (e.g., a release indication), from the parent node (e.g., explicitly or implicitly), that the time resource is available (i.e., released) for use by the child node. If the child node receives such an indication, then the child node can schedule communications in that time resource and/or communicate using that time resource.

As indicated above, FIG. 5 is provided as an example. Other examples are possible and may differ from what was described with regard to FIG. 5.

Figure 6:
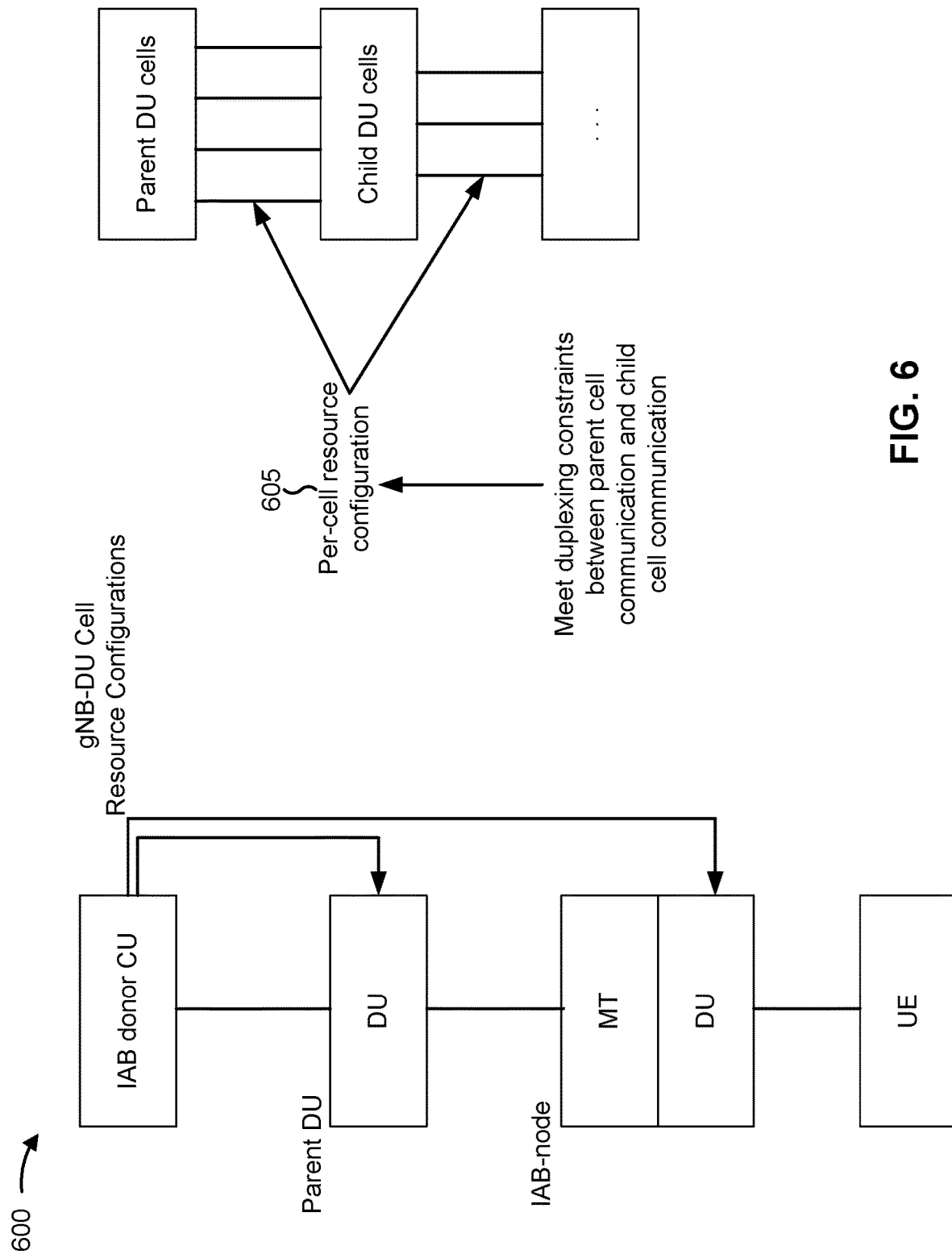
FIG. 6 is a diagram illustrating an example of distributed unit (DU) cell resource configuration for IAB, in accordance with the present disclosure.

FIG. 6 is a diagram illustrating an example 600 of DU cell resource configuration for IAB, in accordance with the present disclosure. Example 600 includes an IAB-donor CU. The IAB-donor CU may be associated with a gNB. The IAB-donor CU may handle resource configuration for the parent DU and the IAB node. Thus, the IAB-donor CU may accommodate half-duplex constraints of the parent DU, the IAB node, and/or other nodes of the IAB network.

The IAB-donor CU may provide a resource configuration via a cell resource configuration, shown as "gNB-DU cell resource configuration." In some aspects, as shown by reference number 605, the cell resource configuration may be specific to a cell. For example, the IAB-donor CU may provide a respective cell resource configuration for each cell served by a DU. The cell resource configuration may indicate at least part of the information described with regard to FIG. 5.

The term "cell" may refer to a logical communication entity used for communication with a base station (e.g., over a carrier), and may be associated with an identifier for distinguishing neighboring cells operating via the same or a different carrier. In some examples, the cells may support different service and/or device types (e.g., MTC, narrowband Internet-of-Things (NB-IoT), enhanced mobile broadband (eMBB), ultra-reliable low-latency (URLLC) communications, and others). In some cases, the term "cell" may refer to a portion of a geographic coverage area (e.g., a sector) over which the logical entity operates. A cell may be referred to as "served by" a DU if the DU handles scheduling for communications via the cell.

A cell may have a cell global identifier (CGI), such as an NR CGI (NCGI). The NCGI uniquely identifies a cell. The NCGI includes a public land mobile network (PLMN) identifier and an NR cell identifier. The PLMN identifier (which may include 24 bits) may include an MCC (e.g., 12 bits) and an MNC (e.g., 12 bits). The NCI (e.g., 36 bits in 5G) may include a gNB identifier (e.g., a leftmost 22 to 32 bits) and a local cell identifier (e.g., the remaining bits of the NCI). The gNB may be unique within a gNB, and may be common for all cells (e.g., all IAB-donor DUs and all IAB-node DUs) served by the gNB with one IAB-donor CU. Equivalently, the PLMN and gNB ID may globally identify a gNB.

As indicated above, FIG. 6 is provided as an example. Other examples are possible and may differ from what was described with regard to FIG. 6.

Figure 7:
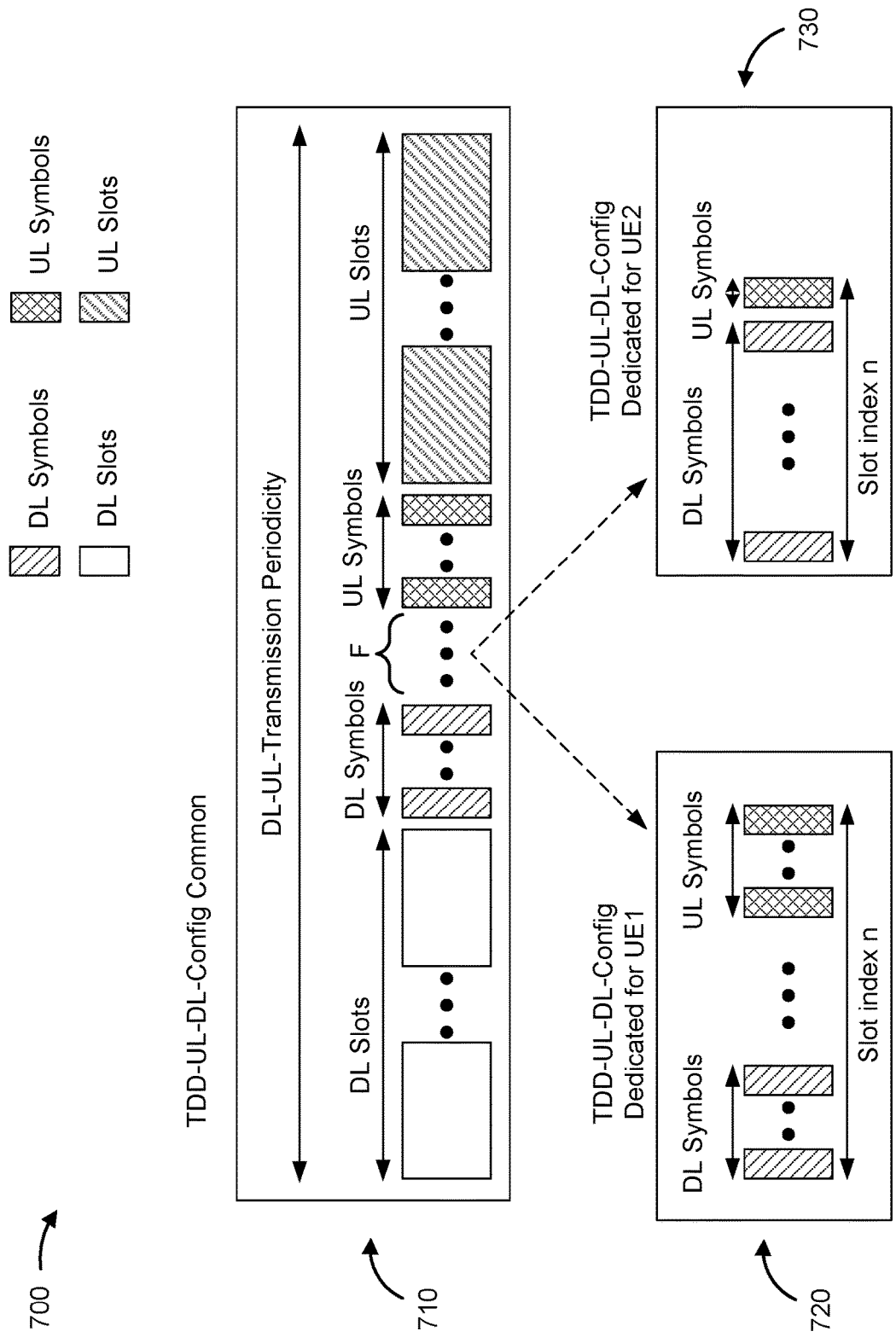
FIG. 7 is a diagram illustrating an example of configuration messages for radio access network (RAN) sharing for IAB, in accordance with the present disclosure.

FIG. 7 is a diagram illustrating an example 700 of cell resource configuration messages for IAB, in accordance with the present disclosure. In some aspects, a network node (e.g., a base station and/or an IAB node) may provide a cell to which a first UE, UE 1 (e.g., UE 120 shown in FIG. 1) and a second UE, UE 2 (e.g., UE 120 shown in FIG. 1) may be connected (e.g., via an RRC connection). One or more cell resource configuration messages may be transmitted to the UE1 and the UE2 to provide cell resource configurations to the UE1 and the UE2. The UE1 and the UE2 may communicate on the cell in accordance with the cell resource configurations.

The network node may transmit, to UE1 and UE2, a common configuration message 710 (shown as "TDD-UL-DL-ConfigCommon"). The common configuration message 710 may indicate a cell specific resource configuration. The cell specific resource configuration may be referred to as a common configuration. As shown, the common configuration message 710 may indicate a periodicity of downlink and uplink transmissions for the cell. The periodicity may refer to an amount of time for which the configuration is applicable. For example, the common configuration message 710 may indicate a number of downlink slots (shown as "DL slots"), a number of downlink symbols (shown as "DL symbols"), a number of uplink slots (shown as "UL slots"), a number of uplink symbols (shown as "UL symbols"), and/or a number of flexible slots and/or symbols (shown as "F"). Flexible slots and/or symbols may be used for uplink or downlink transmissions.

The network node may transmit, to the UE1 (or an MT), a first UE specific resource configuration message 720 (shown as "TDD-UL-DL ConfigDedicated for UE1") that indicates a first UE specific resource configuration. Some aspects may include specific dedicated resource configurations for MTs of IAB-nodes. Thus, aspects discussed herein with regard to UEs may be equally applicable to MTs, but the example is discussed with regard to a UE for clarity of description and readability. A UE specific resource configuration may be referred to as a dedicated configuration and a message used to provide a dedicated configuration may be referred to as a dedicated configuration message. A UE specific resource configuration may be an MT specific resource configuration. The first UE specific resource configuration may be provided to the UE1 (e.g., via the first UE specific resource configuration message 720) in addition to, or in lieu of, a cell specific resource configuration (which may be provided, e.g., via the common configuration message 710). As shown, the first UE specific resource configuration message 720 may indicate an uplink and downlink resource configuration for one or more flexible slots and/or symbols indicated in the common configuration message 710.

The network node may transmit, to the UE2, a second UE specific resource configuration message 730 (shown as TDD-UL-DL-ConfigDedicated for UE2) that indicates a second UE specific resource configuration. The second UE specific resource configuration may be provided (e.g., via the second UE specific resource configuration message 730) in addition to, or in lieu of, a cell specific resource configuration (which may be provided, e.g., via the common configuration message 710). As shown, the second UE specific resource configuration message 730 may indicate an uplink and downlink resource configuration for one or more flexible slots and/or symbols indicated in the common configuration message 710.

Different types of cell resource configurations may provide different types of information to a UE. For example, a common configuration (e.g., the common configuration described above that is provided using the common configuration message 710) may provide cell specific configuration information and may be transmitted using a system information block 1 (SIB1). The SIB1 may be broadcast or transmitted in a dedicated manner (e.g., unicast). A common configuration may provide configuration information having a coarse granularity with respect to a resource configuration. For example, a common configuration may provide uplink and downlink configurations of slots.

A dedicated configuration (e.g., the dedicated configuration described above that is provided using the first UE specific resource configuration message 720 and/or the dedicated configuration provided using the second UE specific resource configuration message 730) may provide UE specific configuration information and may be transmitted from a DU to a CU to a UE, from a CU to a UE, and/or from a CU to a DU. A dedicated configuration may provide configuration information having a fine granularity (e.g., finer than the granularity associated with a common configuration) with respect to a resource configuration. A dedicated configuration may comply with a common configuration and may override flexible symbols indicated in the common configuration. For example, a dedicated configuration may provide uplink and downlink configurations of symbols.

A gNB-DU cell resource configuration may provide cell specific configuration information and may be transmitted from a CU to a DU. A gNB-DU cell resource configuration may provide configuration information having the finest granularity (e.g., finer than the granularity associated with a dedicated configuration) with respect to a resource configuration. For example, a gNB-DU cell resource configuration may indicate uplink and downlink availability at the symbol level that comply with multiplexing constraints such as, for example, a half-duplex constraint. A gNB-DU cell resource configuration may override a common configuration and may indicate resource availability.

An intended time division duplex downlink uplink (TDD DL-UL) configuration may provide cell specific configuration information and may be transmitted from a DU to a CU, from a CU to a DU, or among gNBs. An intended configuration may provide configuration information having a fine granularity (e.g., finer than the granularity associated with a common configuration) with respect to a resource configuration. An intended configuration may be transmitted using an intended configuration message that includes a format similar or identical to that of a common configuration message and a dedicated configuration message.

As indicated above, FIG. 7 is provided as an example. Other examples are possible and may differ from what was described with regard to FIG. 7. For example, in some examples, additional configurations and/or configuration messages may be utilized. In some aspects, dedicated configuration messages may be used for any number of different UEs or MTs.

Figure 8:
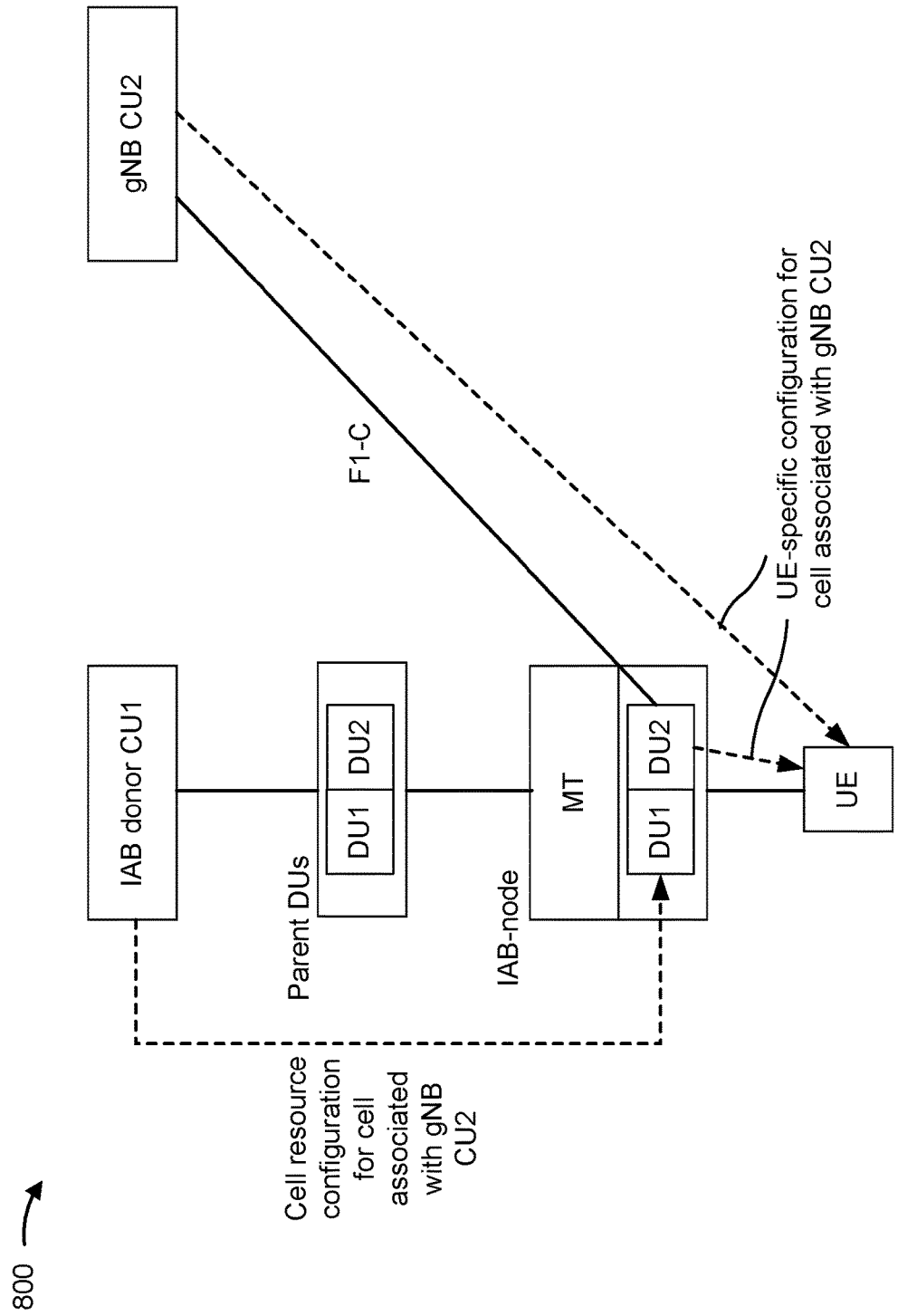
FIG. 8 is a diagram illustrating an example of RAN sharing for IAB, in accordance with the present disclosure.

FIG. 8 is a diagram illustrating an example 800 of RAN sharing for IAB, in accordance with the present disclosure.

As shown in FIG. 8, in an RAN sharing scenario, there may be two CUs: an IAB donor CU1 (referred to as a CU1) and a gNB CU2 (referred to as a CU2). CU1 may be associated with an enhanced gNB that supports IAB functionality. CU2 may be associated with an access network gNB or an IAB-supporting gNB. CU2 may treat the DUs of the parent DU and the IAB-node (shown as DU2) as wireline DUs. In other words, in some cases, CU2 may not know that the DUs of example 800 are part of an IAB network and are associated with a wireless backhaul. For example, CU2 may communicate with the DUs of the parent DU and the IAB-node based at least in part on an F1 control (F1-C) protocol or an RRC protocol in the Internet Protocol (IP) layer. In some aspects, CU1 and CU2 may be associated with different networks, such as different PLMNs or different non-public networks (NPNs). In some aspects, CU1 and CU2 may be associated with the same network, such as the same PLMN or the same NPN. In some aspects, CU1 and CU2 may be associated with different mobile network operators. In some aspects, the parent DUs of the IAB node may be associated with the IAB-donor CU1. For example, the parent DUs may be implemented by a gNB associated with the IAB-donor CU1. In some aspects, the parent DUs of the IAB node may be associated with a parent node of the IAB node.

In some aspects, a cell may be associated with one CU (e.g., IAB-donor CU1) and another cell associated with another CU (e.g., gNB-CU2) may be served on the same physical resources (e.g., the same antenna, the same transmit or receive resources, and/or the same network node, among other examples). In some aspects, the same cell may serve children of two CUs. In this example, the cell may be associated with multiple NCIs (but may still have a unique NCGI).

CU1 may provide cell resource configurations for the parent DU and the IAB-node, since CU1 supports IAB functionality. Thus, CU1 may accommodate half-duplex constraints of the parent DU and/or the IAB node. In some cases, as shown in FIG. 8, an IAB node may be associated with DUs that are associated with two or more different CUs (such as CU1 and CU2 of example 800). A cell resource configuration (e.g., a common resource configuration) generated by a first CU (such as CU1) for a cell associated with a second CU (such as CU2) and transmitted to a first DU (such as DU1) may conflict with a UE specific resource configuration generated by CU2 and transmitted to a second DU (such as DU2) or a child such as the UE.

For example, CU2 might indicate to the UE in the dedicated configuration (and provide a copy to the scheduling DU, in this case DU2) that a resource is uplink. On the other hand, CU1 might indicate to the IAB-node in the cell resource configuration of the cell serving the UE that this same resource is downlink. In this case either the IAB-node schedules the UE in downlink, but the UE is expecting uplink, so the UE observes a scheduling error, or the IAB-node chooses not to schedule the UE (in order to avoid the scheduling error), so the resource ends up being not used for that UE, which may lead to inefficient use of the resources. Such scheduling errors and/or inefficiencies may negatively impact network performance.

Some techniques and apparatuses described herein provide signaling that enables an IAB node to indicate, to an IAB donor CU associated with the IAB node, information that can enable the IAB donor CU to generate a cell resource configuration that does not conflict with UE specific resource configurations generated by the second CU. By providing cell resource configurations that do not conflict with the resource configurations generated by the second CU, the IAB donor CU may reduce scheduling errors, improve efficiency of communication, and improve utilization of network resources, thereby positively impacting network performance.

As indicated above, FIG. 8 is provided as an example. Other examples may differ from what was described with regard to FIG. 8.

Figure 9:
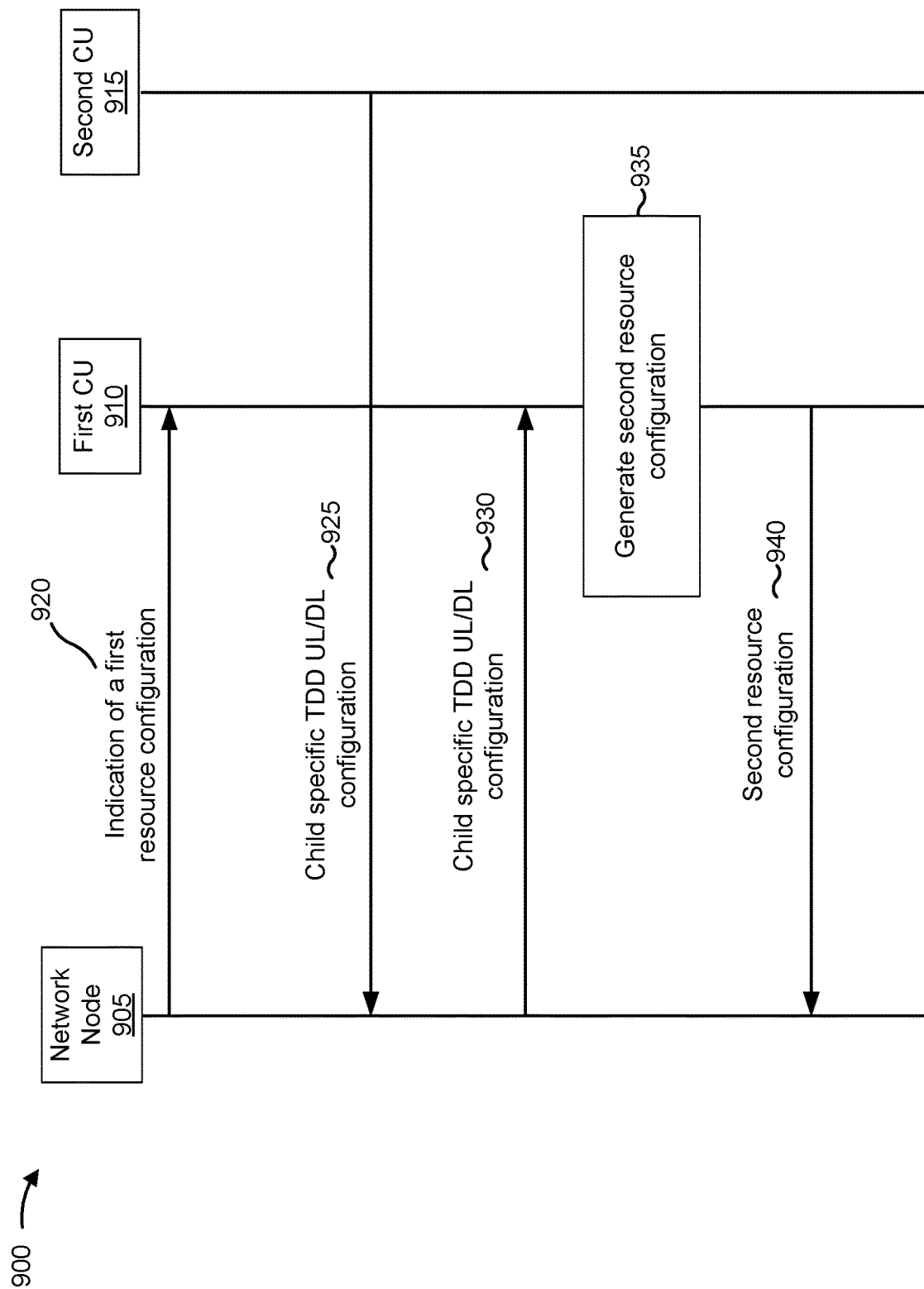
FIGS. 9 and 10 are diagrams illustrating examples associated with resource configuration for IAB RAN sharing, in accordance with the present disclosure.

FIG. 9 is a diagram illustrating an example 900 of signaling associated with resource configuration for IAB RAN sharing, in accordance with the present disclosure. As shown, example 900 includes a network node 905, a first CU 910 (e.g., an IAB donor CU) and a second CU 915 (e.g., a second IAB donor CU and/or a gNB CU). The network node may include, for example, an IAB node (e.g., similar to the IAB node of FIG. 8). The first CU 910 may include an IAB donor CU (e.g., similar to the IAB donor CU1 of FIG. 8). For example, the first CU 910 may oversee resource management for IAB. The second CU 915 may include a gNB CU (e.g., similar to the gNB CU2 of FIG. 8). For example, the second CU 915 may use an IAB network managed by the first CU 910 for traffic transport. The first CU 910 may be associated with a first network and the second CU 915 may be associated with a second network. The network node 905 may provide service to a child node of the network node 905. The child node may be associated with an RRC connection to the second CU 915. The child node may be a UE and/or an IAB node.

As shown by reference number 920, the network node 905 may transmit, to a first CU 910 that corresponds to an IAB donor, an indication of a first resource configuration for communications corresponding to a cell served by the network node 905 and associated with a second CU 915 that corresponds to a base station. As indicated below, the first CU 910 may use the indication of the first resource configuration to generate a second resource configuration. The first resource configuration may be specific to the cell and/or a child node served by the cell. The indication of the first resource configuration may be transported via a signaling connection between the first CU 910 and the network node 905. The signaling connection may be associated with at least one of an F1 control protocol or an RRC protocol. A signaling connection between the second CU 915 and the network node 905 may be associated with at least one of an F1 control protocol or an RRC protocol.

The first resource configuration may indicate at least one of a time resource, a frequency resource, or a spatial resource. The first resource configuration may include a cell-specific TDD uplink and downlink configuration. For example, the first resource configuration may be, or be similar to, the common configuration message described above with regard to FIG. 7. In some aspects, the first resource configuration includes an intended cell-specific TDD uplink and downlink configuration. The intended cell-specific TDD uplink and downlink configuration may include a repurposed format associated with cross-link interference mitigation.

In some aspects, the network node 905 may transmit, to the first CU 910, at least a portion of a SIB1 message associated with the cell. In some aspects, the cell may be associated with a cell identifier that identifies the base station. The cell may be associated with a cell identifier that identifies the IAB donor, and the cell may be deactivated by the first CU 910 or may be barred for access by child nodes that select a network associated with the first CU 910. In some aspects, the cell may operate according to a TDD mode. In some aspects, the cell may operate according to a frequency division duplex (FDD) mode.

As shown by reference number 925, the network node 905 may receive, from the second CU 915, a child-specific TDD uplink and downlink configuration associated with a child node served on the cell. As shown by reference number 930, the network node 905 may forward the child-specific TDD uplink and downlink configuration to the first CU 910.

As shown by reference number 935, the first CU 910 may generate a second resource configuration. The second resource configuration may indicate at least one of a time resource, a frequency resource, or a spatial resource. The second resource configuration may include a gNB-DU cell resource configuration.

The second resource configuration may be based at least in part on the child-specific TDD uplink and downlink configuration. In some aspects, the second resource configuration may be based at least in part on a downlink-uplink flexible (DUF) configuration having a conflict level with one or more non-flexible resources of the first resource configuration that satisfies a conflict criterion. The second resource configuration may be based at least in part on an indication of availability of one or more resources for at least one communication associated with the second CU 915. In some aspects, the at least one communication of the cell associated with the second CU 915 may include at least one of an SSB transmission, a CSI-RS transmission, a scheduling request (SR) configuration, a SIB1 PRACH configuration, or a PDCCH configuration. As shown by reference number 940, the first CU 910 may transmit, and the network node 905 may receive, the second resource configuration.

In some aspects, the network node 905 may transmit a suggested DUF configuration to the first CU 910, and the first CU 910 may generate the second resource configuration based at least in part on the suggested DUF configuration. The network node 905 may transmit an indication of one or more conflicts between the second resource configuration and a third resource configuration associated with the cell. The first CU 910 may generate the second resource configuration based at least in part on the indication of the one or more conflicts. In some aspects, the network node 905 may transmit a suggested availability indication configuration to the first CU 910. The first CU 910 may generate the second resource configuration based at least in part on the suggested availability indication configuration.

As indicated above, FIG. 9 is provided as an example. Other examples may differ from what was described with regard to FIG. 9.

Figure 10:
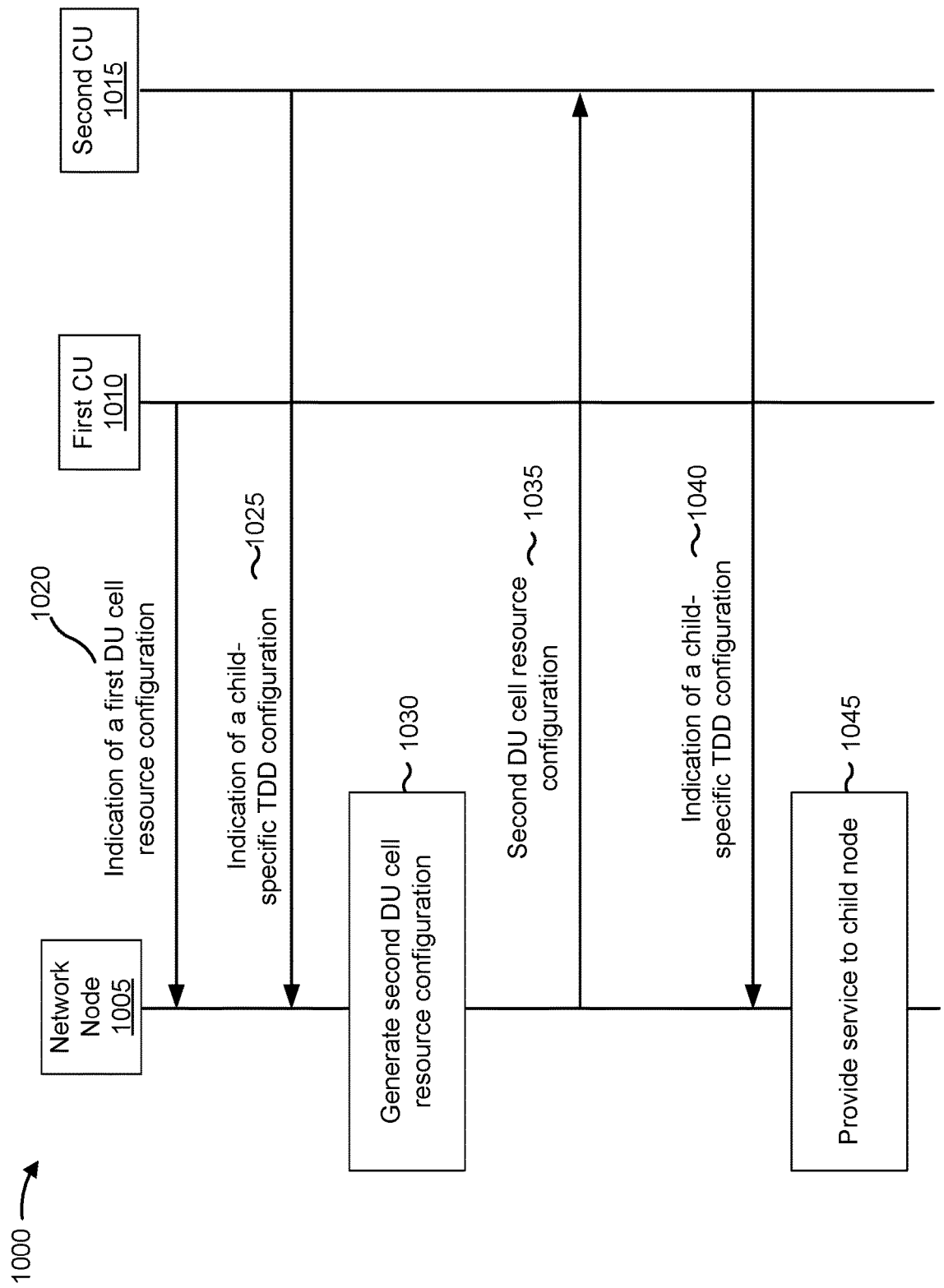

FIG. 10 is a diagram illustrating an example 1000 of signaling associated with resource configuration for IAB RAN sharing, in accordance with the present disclosure. As shown, example 1000 includes a network node 1005, a first CU 1010 (e.g., an IAB donor CU) and a second CU 1015 (e.g., a second IAB donor CU and/or a gNB CU). The network node may include, for example, the IAB node of FIG. 8. The first CU 1010 may include an IAB donor CU (e.g., similar to the IAB donor CU1 of FIG. 8). For example, the first CU 1010 may oversee resource management for IAB. The second CU 1015 may include a gNB CU (e.g., similar to the gNB CU2 of FIG. 8). For example, the second CU 1015 may use an IAB network managed by the first CU 1010 for traffic transport. The first CU 1010 may be associated with a first network and the second CU 1015 may be associated with a second network. The network node 1005 may provide service to a child node of the network node 1005. The child node may be associated with an RRC connection to the second CU 1015. The child node may be a UE and/or an IAB node.

As shown by reference number 1020, the first CU 1010 may transmit, and the network node 1005 may receive, an indication of a first DU cell resource configuration for communications corresponding to a cell served by the network node 1005 and associated with the second CU 1015. The first CU 1010 may transmit the indication of the first DU cell resource configuration based at least in part on receiving an indication from the network node 1005 that the network node 1005 serves a cell associated with the second CU 1015 and/or this cell has been activated by second CU 1015, and/or determining that a child node has connected to the cell (and thus, is to receive a resource configuration), among other examples.

The first DU cell resource configuration may be specific to a child node served by the cell. In some aspects, the indication of the first DU cell resource configuration may be transported via a signaling connection between the first CU 1010 and the network node 1005. The signaling connection may be associated with at least one of an F1 control protocol or an RRC protocol. The cell may operate according to a TDD mode and/or an FDD mode. The first DU cell resource configuration may include an uplink configuration and a downlink configuration.

As shown by reference number 1025, the second CU 1015 may transmit, and the network node 1005 may receive, a child-specific TDD configuration for a child node such as a child node that has connected to the cell. For example, the child-specific TDD configuration may be, or be similar to, the dedicated configuration message described above with regard to FIG. 7. The child-specific TDD configuration may be received via a signaling connection between the second CU 1015 and the network node 1005. The signaling connection may be associated with at least one of an F1 control protocol or an RRC protocol.

As shown by reference number 1030, the network node 1005 may generate a second DU cell resource configuration. The network node 1005 may generate the second DU cell resource configuration based at least in part on the first DU cell resource configuration, and/or the child-specific TDD configuration, among other examples. In some aspects, the second DU cell resource configuration may be specific to a child node served by the cell. In some aspects, the second DU cell resource configuration may be the same as the first DU cell resource configuration. In some aspects, the second DU cell resource configuration may include a hard-soft-not available (HSNA) slot configuration of the first DU cell resource configuration. In some aspects, the second DU cell resource configuration may include a DUF configuration of the first DU cell resource configuration.

In some aspects, the second DU cell resource configuration may be a coarse version of the first DU cell resource configuration. For example, in some aspects, the network node 1005 may use the slot format (e.g., number of downlink symbols, number of uplink symbols) for the second DU cell resource configuration to approximate a DUF slot configuration of the first DU cell resource configuration. The network node 1005 may indicate whether the slot format has a downlink-flexible-uplink (DFU) pattern or an uplink-flexible-downlink (UFD) pattern.

In some aspects, the network node 1005 may use an Intended TDD DL-UL configuration for the second DU cell resource configuration to convey at least a portion of the DUF slot configuration of the first DU cell resource configuration. The Intended TDD DL-UL configuration is a configuration that may be used for crosslink interference management. The Intended TDD DL-UL configuration may carry a subcarrier spacing, cyclic prefix and TDD DL-UL slot configuration of an NR cell that a receiving NG-RAN node is to take into account for cross-link interference mitigation, and/or for NR-DC power coordination, when operating its own cells. In some aspects, the Intended TDD DL-UL configuration may merge TDD configuration information associated with two or more gNB-DUs.

The first DU cell resource configuration may overwrite a flexible time resource associated with a prior cell-specific TDD configuration for uplink and downlink communications associated with the cell. The cell-specific TDD configuration for uplink and downlink may be, or be similar to, to the common configuration message described above with regard to FIG. 7. The second DU cell resource configuration may include the new cell-specific TDD configuration. The second DU cell resource configuration may include a slot availability configuration associated with the first DU cell resource configuration. The second DU cell resource configuration may include a downlink-uplink flexible configuration associated with the first DU cell resource configuration.

In some aspects, the network node 1005 may determine at least one conflict between the first DU cell resource configuration and the child-specific TDD configuration. The network node 1005 may generate the second DU cell resource configuration based at least in part on determining the at least one conflict. The network node 1005 may transmit the indication of the second DU cell resource configuration based at least in part on determining the at least one conflict. In some aspects, the second DU cell resource configuration may include the child-specific TDD configuration.

As shown by reference number 1035, the network node 1005 may transmit, and the second CU 1015 may receive, an indication of the second DU cell resource configuration based at least in part on the first DU cell resource configuration. The indication of the second DU cell resource configuration may indicate a slot format for the second DU cell resource configuration. The indication of the second DU cell resource configuration may indicate a symbol pattern associated with the slot format. The second DU cell resource configuration may be used to cause the second CU 1015 to generate a child-specific TDD configuration for a child node served on the cell that does not conflict with the first DU cell resource configuration.

In some aspects, the network node 1005 may transmit, and the second CU 1015 may receive, an indication to stop generating child-specific TDD configurations for child nodes served on the cell. For example, the network node 1005 instead may generate child-specific TDD configurations for child nodes that do not conflict with the first DU cell resource configuration and may provide the second CU 1015 with these child-specific TDD configurations.

For example, the network node 1005 may generate, based at least in part on the first DU cell resource configuration, a cell-specific TDD configuration for uplink and downlink communications associated with the cell. In some aspects, the network node 1005 may generate a new cell-specific TDD configuration for uplink and downlink communications associated with the cell based at least in part on the first DU cell resource configuration. The network node 1005 may provide the new cell-specific TDD configuration for uplink and downlink communications to the second CU 1015. The new cell-specific configuration may cause the second CU 1015 to generate child-specific TDD configurations for child nodes based on the new cell-specific TDD configuration, which do not conflict with the first DU cell resource configuration.

As shown by reference number 1040, the second CU 1015 may transmit, and the network node 1005 may receive, a child-specific TDD configuration for a child node. For example, the second DU cell resource configuration may be used to cause the second CU 1015 to generate a child-specific TDD configuration (or a modified child-specific configuration) that complies with the second DU cell resource configuration.

As shown by reference number 1045, the network node 1005 may provide service to a child node of the network node 1005. The child node may be associated with an RRC connection to the second CU 1015 and the network node 1005 may provide the service based at least in part on the first DU cell resource configuration, and/or the child-specific TDD configuration received from the second CU 1015, among other examples. In some aspects, the child node may be, for example, a UE and/or an IAB node.

In some aspects, the first DU cell resource configuration and/or the second DU cell resource configuration may indicate availability of a communication resource of the cell. For example, the first DU cell resource configuration and/or the second DU cell resource configuration may indicate that the resource is available, not available, or conditionally available. The first DU cell resource configuration and/or the second DU cell resource configuration may indicate a direction of a communication resource of the cell. For example, the first DU cell resource configuration and/or the second DU cell resource configuration may indicate that the resource is an uplink resource, a downlink resource, or a flexible resource. The first DU cell resource configuration and/or the second DU cell resource configuration may indicate a cell direction of the cell. For example, first DU cell resource configuration and/or the second DU cell resource configuration may indicate that the cell direction is uplink, downlink, or bidirectional.

The first DU cell resource configuration and/or the second DU cell resource configuration may be defined at different time granularities. For example, the first DU cell resource configuration and/or the second DU cell resource configuration may be defined at a per-slot granularity, a per-symbol granularity, or a per-symbol-group granularity. The first DU cell resource configuration and/or the second DU cell resource configuration may be defined at different frequency granularities. For example, the first DU cell resource configuration and/or the second DU cell resource configuration may be defined for a carrier associated with the cell. In some aspects, the first DU cell resource configuration and/or the second DU cell resource configuration may be defined at a per-bandwidth-part granularity, a per-resource-block granularity, or a per-resource-block-group granularity.

The first DU cell resource configuration and/or the second DU cell resource configuration may be associated with a spatial region. For example, the first DU cell resource configuration and/or the second DU cell resource configuration may be associated with a beam direction and/or an SSB area.

As indicated above, FIG. 10 is provided as an example. Other examples may differ from what was described with regard to FIG. 10. For example, the first DU cell resource configuration and/or the second DU cell resource configuration may be associated with any number of other communication and/or environmental characteristics.

Figure 11:
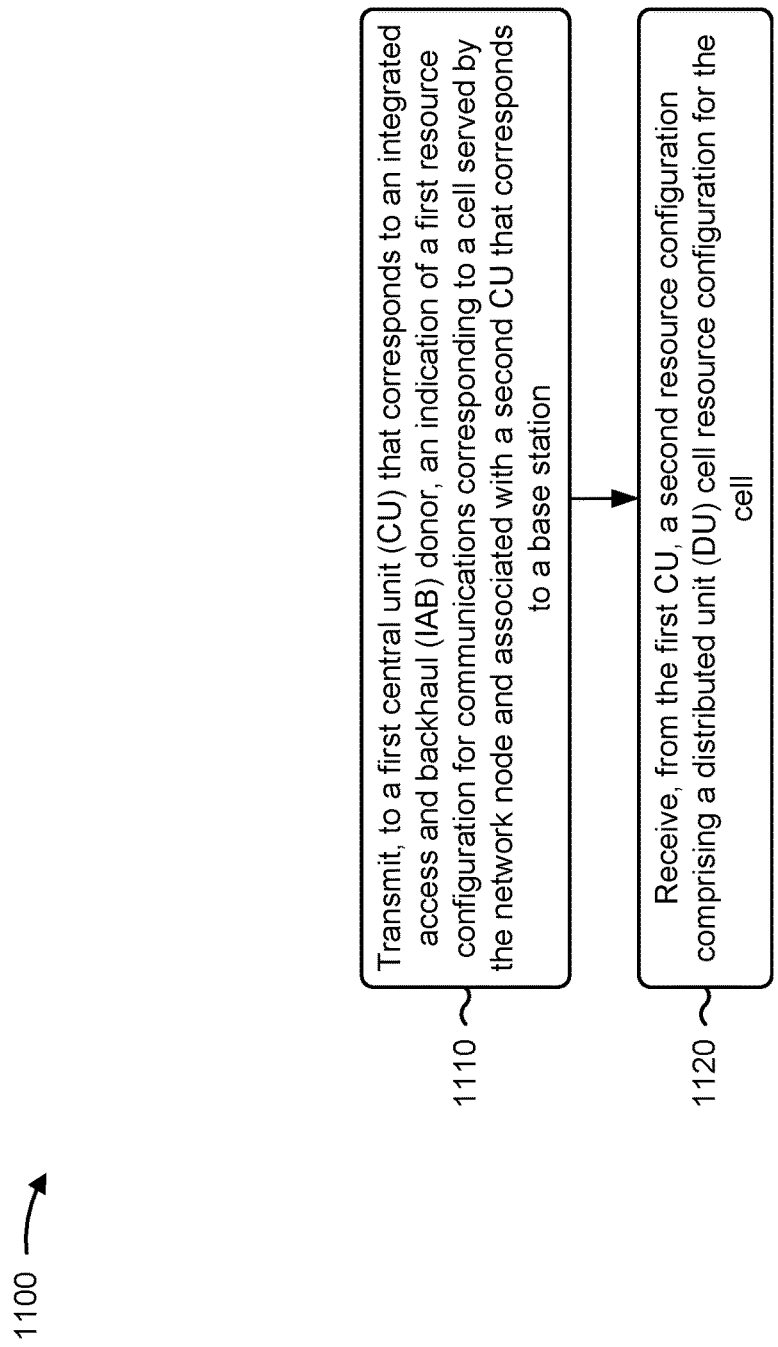
FIGS. 11-14 are diagrams illustrating example processes associated with resource configuration for IAB RAN sharing, in accordance with the present disclosure.

FIG. 11 is a diagram illustrating an example process 1100 performed, for example, by a network node, in accordance with the present disclosure. Example process 1100 is an example where the network node (e.g., network node 905 shown in FIG. 9) performs operations associated with resource configuration for integrated access and backhaul radio access network sharing.

As shown in FIG. 11, in some aspects, process 1100 may include transmitting, to first CU that corresponds to an IAB donor, an indication of a first resource configuration for communications corresponding to a cell served by the network node and associated with a second CU that corresponds to a base station (block 1110). For example, the network node (e.g., using transmission component 1504, depicted in FIG. 15) may transmit, to CU that corresponds to an IAB donor, an indication of a first resource configuration for communications corresponding to a cell served by the network node and associated with a second CU that corresponds to a base station, as described above.

As further shown in FIG. 11, in some aspects, process 1100 may include receiving, from the first CU, a second resource configuration comprising a DU cell resource configuration for the cell (block 1120). For example, the network node (e.g., using reception component 1502, depicted in FIG. 15) may receive, from the first CU, a second resource configuration comprising a DU cell resource configuration for the cell, as described above.

Process 1100 may include additional aspects, such as any single aspect or any combination of aspects described below and/or in connection with one or more other processes described elsewhere herein.

In a first aspect, the first resource configuration is specific to a child node served by the cell.

In a second aspect, alone or in combination with the first aspect, the DU cell resource configuration is specific to a child node served by the cell.

In a third aspect, alone or in combination with one or more of the first and second aspects, the first CU is a first IAB donor CU and the second CU is a second IAB donor CU.

In a fourth aspect, alone or in combination with one or more of the first through third aspects, the first CU is associated with a first network and the second CU is associated with a second network.

In a fifth aspect, alone or in combination with one or more of the first through fourth aspects, the first CU is associated with resource management for an IAB network including the network node, and wherein traffic associated with the second CU is transported via the IAB network.

In a sixth aspect, alone or in combination with one or more of the first through fifth aspects, the indication of the first resource configuration is transported via a signaling connection between the first CU and the network node, and wherein the signaling connection is associated with at least one of an F1 control protocol, or an RRC protocol.

In a seventh aspect, alone or in combination with one or more of the first through sixth aspects, a signaling connection between the second CU and the network node is associated with at least one of an F1 control protocol, or an RRC protocol.

In an eighth aspect, alone or in combination with one or more of the first through seventh aspects, process 1100 includes providing service to a child node of the network node, wherein the child node is associated with an RRC connection to the second CU.

In a ninth aspect, alone or in combination with one or more of the first through eighth aspects, the child node is a UE.

In a tenth aspect, alone or in combination with one or more of the first through ninth aspects, the child node is an IAB node.

In an eleventh aspect, alone or in combination with one or more of the first through tenth aspects, the cell is associated with a cell identifier that identifies the base station.

In a twelfth aspect, alone or in combination with one or more of the first through eleventh aspects, the cell is associated with a cell identifier that identifies the IAB donor, and wherein the cell is deactivated by the first CU or is barred for access by child nodes that select a network associated with the first CU.

In a thirteenth aspect, alone or in combination with one or more of the first through twelfth aspects, the cell operates according to a TDD mode.

In a fourteenth aspect, alone or in combination with one or more of the first through thirteenth aspects, the cell operates according to an FDD mode.

In a fifteenth aspect, alone or in combination with one or more of the first through fourteenth aspects, the DU cell resource configuration comprises an uplink configuration and a downlink configuration.

In a sixteenth aspect, alone or in combination with one or more of the first through fifteenth aspects, the first resource configuration indicates at least one of a time resource, a frequency resource, or a spatial resource.

In a seventeenth aspect, alone or in combination with one or more of the first through sixteenth aspects, the second resource configuration indicates at least one of a time resource, a frequency resource, or a spatial resource.

In an eighteenth aspect, alone or in combination with one or more of the first through seventeenth aspects, the first resource configuration comprises a cell-specific TDD uplink and downlink configuration.

In a nineteenth aspect, alone or in combination with one or more of the first through eighteenth aspects, the first resource configuration comprises an intended cell-specific TDD uplink and downlink configuration, wherein the intended cell-specific TDD uplink and downlink configuration comprises a repurposed format associated with cross-link interference mitigation.

In a twentieth aspect, alone or in combination with one or more of the first through nineteenth aspects, process 1100 includes transmitting, to the first CU, at least a portion of a system information block 1 (SIB1) message associated with the cell.

In a twenty-first aspect, alone or in combination with one or more of the first through twentieth aspects, process 1100 includes receiving, from the second CU, a child-specific TDD uplink and downlink configuration associated with a child node served on the cell, and forwarding the child-specific TDD uplink and downlink configuration to the first CU, wherein the second resource configuration is based at least in part on the child-specific TDD uplink and downlink configuration.

In a twenty-second aspect, alone or in combination with one or more of the first through twenty-first aspects, the second resource configuration is based at least in part on a DUF configuration having a conflict level with one or more non-flexible resources of the first resource configuration that satisfies a conflict criterion.

In a twenty-third aspect, alone or in combination with one or more of the first through twenty-second aspects, the second resource configuration is based at least in part on an indication of availability of one or more resources for at least one communication associated with the second CU.

In a twenty-fourth aspect, alone or in combination with one or more of the first through twenty-third aspects, the at least one communication associated with the second CU comprises at least one of a synchronization signal block transmission, a channel state information reference signal transmission, scheduling request configuration, a system information block 1 physical random access channel configuration, or a physical downlink control channel configuration.

In a twenty-fifth aspect, alone or in combination with one or more of the first through twenty-fourth aspects, process 1100 includes transmitting a suggested DUF configuration to the first CU, wherein the second resource configuration is based at least in part on the suggested DUF configuration.

In a twenty-sixth aspect, alone or in combination with one or more of the first through twenty-fifth aspects, process 1100 includes transmitting an indication of one or more conflicts between the second resource configuration and a third resource configuration associated with the cell, and receiving a modified second resource configuration, wherein the modified second resource configuration is based at least in part on the indication of the one or more conflicts.

In a twenty-seventh aspect, alone or in combination with one or more of the first through twenty-sixth aspects, process 1100 includes transmitting a suggested availability indication configuration to the first CU, wherein the second resource configuration is based at least in part on the suggested availability indication configuration.

In a twenty-eighth aspect, alone or in combination with one or more of the first through twenty-seventh aspects, process 1100 includes transmitting an indication of one or more conflicts between the second resource configuration and a third resource configuration associated with the second CU, wherein the third resource configuration corresponds to at least one communication associated with the cell, and receiving a modified second resource configuration, wherein the modified second resource configuration is based at least in part on the indication of the one or more conflicts.

In a twenty-ninth aspect, alone or in combination with one or more of the first through twenty-eighth aspects, the at least one communication associated with the cell comprises at least one of a synchronization signal block transmission, a channel state information reference signal transmission, scheduling request configuration, a system information block 1 physical random access channel configuration, or a physical downlink control channel configuration.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
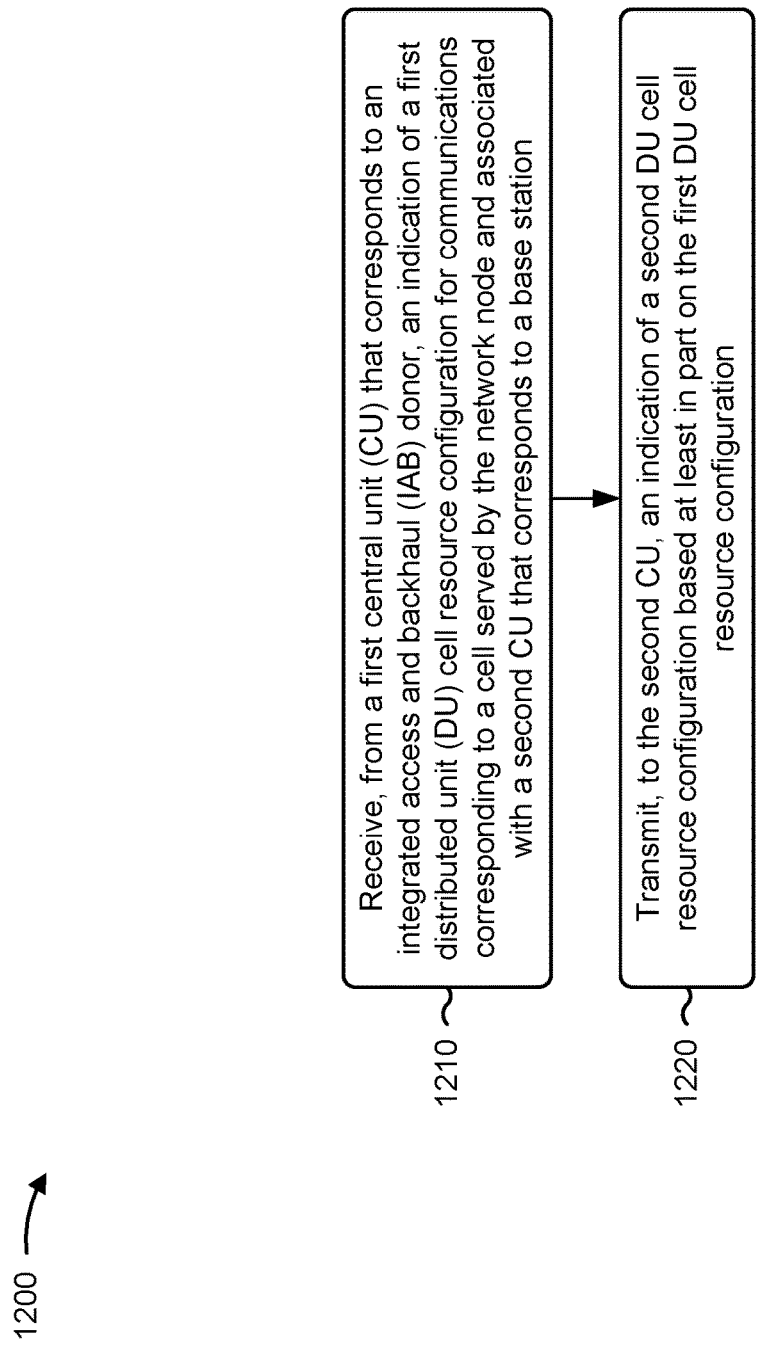

FIG. 12 is a diagram illustrating an example process 1200 performed, for example, by a network node, in accordance with the present disclosure. Example process 1200 is an example where the network node (e.g., network node 1005 shown in FIG. 10) performs operations associated with uplink and downlink configuration for IAB RAN sharing.

As shown in FIG. 12, in some aspects, process 1200 may include receiving, from a first CU that corresponds to an IAB donor, an indication of a first DU cell resource configuration for communications corresponding to a cell served by the network node and associated with a second CU that corresponds to a base station (block 1210). For example, the network node (e.g., using reception component 1502, depicted in FIG. 15) may receive, from a first CU that corresponds to an IAB donor, an indication of a first DU cell resource configuration for communications corresponding to a cell served by the network node and associated with a second CU that corresponds to a base station, as described above.

As further shown in FIG. 12, in some aspects, process 1200 may include transmitting, to the second CU, an indication of a second DU cell resource configuration based at least in part on the first DU cell resource configuration (block 1220). For example, the network node (e.g., using transmission component 1504, depicted in FIG. 15) may transmit, to the second CU, an indication of a second DU cell resource configuration based at least in part on the first DU cell resource configuration, as described above.

Process 1200 may include additional aspects, such as any single aspect or any combination of aspects described below and/or in connection with one or more other processes described elsewhere herein.

In a first aspect, process 1200 includes generating the second DU cell resource configuration based at least in part on the first DU cell resource configuration.

In a second aspect, alone or in combination with the first aspect, the first DU cell resource configuration is specific to a child node served by the cell.

In a third aspect, alone or in combination with one or more of the first and second aspects, the second DU cell resource configuration is specific to a child node served by the cell.

In a fourth aspect, alone or in combination with one or more of the first through third aspects, the first CU is a first IAB donor CU and the second CU is a second IAB donor CU.

In a fifth aspect, alone or in combination with one or more of the first through fourth aspects, the first CU is associated with a first network and the second CU is associated with a second network.

In a sixth aspect, alone or in combination with one or more of the first through fifth aspects, the first CU is associated with resource management for an IAB network including the network node, and wherein traffic associated with the second CU is transported via the IAB network.

In a seventh aspect, alone or in combination with one or more of the first through sixth aspects, the indication of the first DU cell resource configuration is transported via a signaling connection between the first CU and the network node, and wherein the signaling connection is associated with at least one of an F1 control protocol, or a radio resource control protocol.

In an eighth aspect, alone or in combination with one or more of the first through seventh aspects, a signaling connection between the second CU and the network node is associated with at least one of an F1 control protocol, or a radio resource control protocol.

In a ninth aspect, alone or in combination with one or more of the first through eighth aspects, process 1200 includes providing service to a child node of the network node, wherein the child node is associated with a radio resource control connection to the second CU.

In a tenth aspect, alone or in combination with one or more of the first through ninth aspects, the child node is a UE.

In an eleventh aspect, alone or in combination with one or more of the first through tenth aspects, the child node is an IAB node.

In a twelfth aspect, alone or in combination with one or more of the first through eleventh aspects, process 1200 includes providing service to a child node of the network node, wherein the child node is associated with a radio resource control connection to the first CU.

In a thirteenth aspect, alone or in combination with one or more of the first through twelfth aspects, the child node is a UE.

In a fourteenth aspect, alone or in combination with one or more of the first through thirteenth aspects, the child node is an IAB node.

In a fifteenth aspect, alone or in combination with one or more of the first through fourteenth aspects, the cell operates according to a TDD mode.

In a sixteenth aspect, alone or in combination with one or more of the first through fifteenth aspects, the cell operates according to a FDD mode.

In a seventeenth aspect, alone or in combination with one or more of the first through sixteenth aspects, the first DU cell resource configuration comprises an uplink configuration and a downlink configuration.

In an eighteenth aspect, alone or in combination with one or more of the first through seventeenth aspects, the first DU cell resource configuration indicates availability of a communication resource of the cell.

In a nineteenth aspect, alone or in combination with one or more of the first through eighteenth aspects, the first DU cell resource configuration indicates a direction of a communication resource of the cell.

In a twentieth aspect, alone or in combination with one or more of the first through nineteenth aspects, the first DU cell resource configuration indicates a cell direction of the cell.

In a twenty-first aspect, alone or in combination with one or more of the first through twentieth aspects, the first DU cell resource configuration is defined at a per-slot granularity.

In a twenty-second aspect, alone or in combination with one or more of the first through twenty-first aspects, the first DU cell resource configuration is defined at a per-symbol granularity.

In a twenty-third aspect, alone or in combination with one or more of the first through twenty-second aspects, the first DU cell resource configuration is defined at a per-symbol-group granularity.

In a twenty-fourth aspect, alone or in combination with one or more of the first through twenty-third aspects, the first DU cell resource configuration is defined for a first carrier associated with the cell.

In a twenty-fifth aspect, alone or in combination with one or more of the first through twenty-fourth aspects, the first DU cell resource configuration is defined at a per-bandwidth-part granularity.

In a twenty-sixth aspect, alone or in combination with one or more of the first through twenty-fifth aspects, the first DU cell resource configuration is defined at a per-resource-block granularity or a per-resource-block-group granularity.

In a twenty-seventh aspect, alone or in combination with one or more of the first through twenty-sixth aspects, the first DU cell resource configuration is associated with a spatial region.

In a twenty-eighth aspect, alone or in combination with one or more of the first through twenty-seventh aspects, the second DU cell resource configuration comprises the first DU cell resource configuration.

In a twenty-ninth aspect, alone or in combination with one or more of the first through twenty-eighth aspects, the second DU cell resource configuration comprises a slot availability configuration associated with the first DU cell resource configuration.

In a thirtieth aspect, alone or in combination with one or more of the first through twenty-ninth aspects, the second DU cell resource configuration comprises a downlink-uplink flexible configuration associated with the first DU cell resource configuration.

In a thirty-first aspect, alone or in combination with one or more of the first through thirtieth aspects, the second DU cell resource configuration comprises a coarse version of the first DU cell resource configuration.

In a thirty-second aspect, alone or in combination with one or more of the first through thirty-first aspects, the indication of the second DU cell resource configuration indicates a slot format for the second DU cell resource configuration.

In a thirty-third aspect, alone or in combination with one or more of the first through thirty-second aspects, the indication of the second DU cell resource configuration indicates a symbol pattern associated with the slot format.

In a thirty-fourth aspect, alone or in combination with one or more of the first through thirty-third aspects, the indication of the second DU cell resource configuration comprises an intended time division duplex downlink-uplink configuration.

In a thirty-fifth aspect, alone or in combination with one or more of the first through thirty-fourth aspects, process 1200 includes receiving, from the second CU, a child-specific TDD configuration for a child node, and determining at least one conflict between the first DU cell resource configuration and the child-specific TDD configuration, wherein transmitting the indication of the second DU cell resource configuration comprises transmitting the indication of the second DU cell resource configuration based at least in part on determining the at least one conflict.

In a thirty-sixth aspect, alone or in combination with one or more of the first through thirty-fifth aspects, the second DU cell resource configuration comprises the child-specific TDD configuration.

In a thirty-seventh aspect, alone or in combination with one or more of the first through thirty-sixth aspects, process 1200 includes transmitting, to the second CU, an indication to stop generating child-specific time division duplex configurations for child nodes served on the cell.

In a thirty-eighth aspect, alone or in combination with one or more of the first through thirty-seventh aspects, the second DU cell resource configuration is to cause the second CU to generate a child-specific TDD configuration for a child node served on the cell, wherein the child-specific TDD configuration does not conflict with the first DU cell resource configuration.

In a thirty-ninth aspect, alone or in combination with one or more of the first through thirty-eighth aspects, process 1200 includes generating, based at least in part on the first DU cell resource configuration, a cell-specific TDD configuration for uplink and downlink communications associated with the cell.

In a fortieth aspect, alone or in combination with one or more of the first through thirty-ninth aspects, the first DU cell resource configuration overwrites a flexible time resource associated with a prior cell-specific TDD configuration for uplink and downlink communications associated with the cell.

In a forty-first aspect, alone or in combination with one or more of the first through fortieth aspects, the second DU cell resource configuration comprises the cell-specific TDD configuration.

In a forty-second aspect, alone or in combination with one or more of the first through forty-first aspects, the second DU cell resource configuration is to cause the second CU to generate a child-specific TDD configuration for a child node served on the cell, wherein the child-specific TDD configuration complies with the cell-specific TDD configuration.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
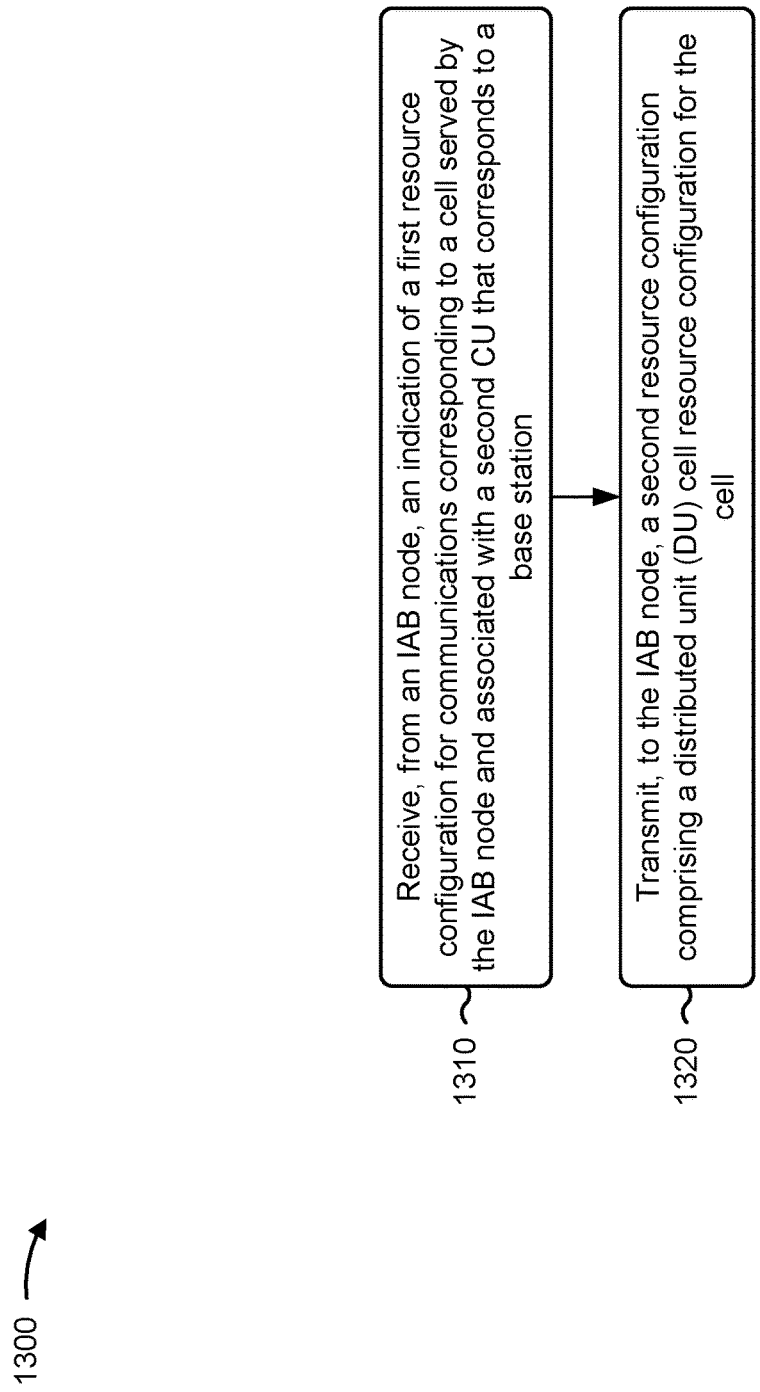

FIG. 13 is a diagram illustrating an example process 1300 performed, for example, by a first CU, in accordance with the present disclosure. Example process 1300 is an example where the first CU (e.g., first CU 910 shown in FIG. 9) performs operations associated with resource configuration for integrated access and backhaul radio access network sharing.

As shown in FIG. 13, in some aspects, process 1300 may include receiving, from an IAB node, an indication of a first resource configuration for communications corresponding to a cell served by the IAB node and associated with a second CU that corresponds to a base station (block 1310). For example, the first CU (e.g., using reception component 1602, depicted in FIG. 16) may receive, from an IAB node, an indication of a first resource configuration for communications corresponding to a cell served by the IAB node and associated with a second CU that corresponds to a base station, as described above.

As further shown in FIG. 13, in some aspects, process 1300 may include transmitting, to the IAB node, a second resource configuration comprising a DU cell resource configuration for the cell (block 1320). For example, the first CU (e.g., using transmission component 1604, depicted in FIG. 16) may transmit, to the IAB node, a second resource configuration comprising a DU cell resource configuration for the cell, as described above.

Process 1300 may include additional aspects, such as any single aspect or any combination of aspects described below and/or in connection with one or more other processes described elsewhere herein.

In a first aspect, process 1300 includes generating the second resource configuration.

In a second aspect, alone or in combination with the first aspect, the first resource configuration is specific to a child node served by the cell.

In a third aspect, alone or in combination with one or more of the first and second aspects, the DU cell resource configuration is specific to a child node served by the cell.

In a fourth aspect, alone or in combination with one or more of the first through third aspects, the first CU is a first IAB donor CU and the second CU is a second IAB donor CU.

In a fifth aspect, alone or in combination with one or more of the first through fourth aspects, the first CU is associated with a first network and the second CU is associated with a second network.

In a sixth aspect, alone or in combination with one or more of the first through fifth aspects, the first CU is associated with resource management for an IAB network including the IAB node, and wherein traffic associated with the second CU is transported via the IAB network.

In a seventh aspect, alone or in combination with one or more of the first through sixth aspects, the indication of the first resource configuration is transported via a signaling connection between the first CU and the IAB node, and wherein the signaling connection is associated with at least one of an F1 control protocol, or an RRC protocol.

In an eighth aspect, alone or in combination with one or more of the first through seventh aspects, a signaling connection between the second CU and the IAB node is associated with at least one of an F1 control protocol, or an RRC protocol.

In a ninth aspect, alone or in combination with one or more of the first through eighth aspects, the cell is associated with a cell identifier that identifies the base station.

In a tenth aspect, alone or in combination with one or more of the first through ninth aspects, the cell is associated with a cell identifier that identifies the IAB donor, and wherein the cell is deactivated by the first CU or is barred for access by child nodes that select a network associated with the first CU.

In an eleventh aspect, alone or in combination with one or more of the first through tenth aspects, the cell operates according to a TDD mode.

In a twelfth aspect, alone or in combination with one or more of the first through eleventh aspects, the cell operates according to an FDD mode.

In a thirteenth aspect, alone or in combination with one or more of the first through twelfth aspects, the DU cell resource configuration comprises an uplink configuration and a downlink configuration.

In a fourteenth aspect, alone or in combination with one or more of the first through thirteenth aspects, the first resource configuration indicates at least one of a time resource, a frequency resource, or a spatial resource.

In a fifteenth aspect, alone or in combination with one or more of the first through fourteenth aspects, the second resource configuration indicates at least one of a time resource, a frequency resource, or a spatial resource.

In a sixteenth aspect, alone or in combination with one or more of the first through fifteenth aspects, the first resource configuration comprises a cell-specific uplink and downlink configuration.

In a seventeenth aspect, alone or in combination with one or more of the first through sixteenth aspects, the first resource configuration comprises an intended cell-specific TDD uplink and downlink configuration, wherein the intended cell-specific TDD uplink and downlink configuration comprises a repurposed format associated with cross-link interference mitigation.

In an eighteenth aspect, alone or in combination with one or more of the first through seventeenth aspects, process 1300 includes receiving, from the IAB node, at least a portion of a SIB1 message associated with the cell.

In a nineteenth aspect, alone or in combination with one or more of the first through eighteenth aspects, process 1300 includes receiving, from the IAB node, a forwarded configuration from the second CU, wherein the forwarded configuration comprises a child-specific TDD uplink and downlink configuration associated with a child node served on the cell, and generating the second resource configuration based at least in part on the child-specific TDD uplink and downlink configuration.

In a twentieth aspect, alone or in combination with one or more of the first through nineteenth aspects, process 1300 includes generating the second resource configuration based at least in part on a DUF configuration having a conflict level with one or more non-flexible resources of the first resource configuration that satisfies a conflict criterion.

In a twenty-first aspect, alone or in combination with one or more of the first through twentieth aspects, process 1300 includes generating the second resource configuration based at least in part on an indication of availability of one or more resources for at least one communication associated with the second CU.

In a twenty-second aspect, alone or in combination with one or more of the first through twenty-first aspects, the at least one communication associated with the second CU comprises at least one of a synchronization signal block transmission, a channel state information reference signal transmission, scheduling request configuration, a system information block 1 physical random access channel configuration, or a physical downlink control channel configuration.

In a twenty-third aspect, alone or in combination with one or more of the first through twenty-second aspects, process 1300 includes receiving, from the IAB node, a suggested DUF configuration, and generating the second resource configuration based at least in part on the suggested DUF configuration.

In a twenty-fourth aspect, alone or in combination with one or more of the first through twenty-third aspects, process 1300 includes receiving an indication of one or more conflicts between the second resource configuration and a third resource configuration associated with the cell, generating a modified second resource configuration based at least in part on the indication of the one or more conflicts, and transmitting the modified second resource configuration.

In a twenty-fifth aspect, alone or in combination with one or more of the first through twenty-fourth aspects, process 1300 includes receiving a suggested availability indication configuration from the IAB node, and generating the second resource configuration based at least in part on the suggested availability indication configuration.

In a twenty-sixth aspect, alone or in combination with one or more of the first through twenty-fifth aspects, process 1300 includes receiving an indication of one or more conflicts between the second resource configuration and a third resource configuration associated with the second CU, wherein the third resource configuration corresponds to at least one communication associated with the cell, generating a modified second resource configuration based at least in part on the indication of the one or more conflicts, and transmitting the modified second resource configuration.

In a twenty-seventh aspect, alone or in combination with one or more of the first through twenty-sixth aspects, the at least one communication associated with the cell comprises at least one of a synchronization signal block transmission, a channel state information reference signal transmission, scheduling request configuration, a SIB1 PRACH configuration, or a PDCCH configuration.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
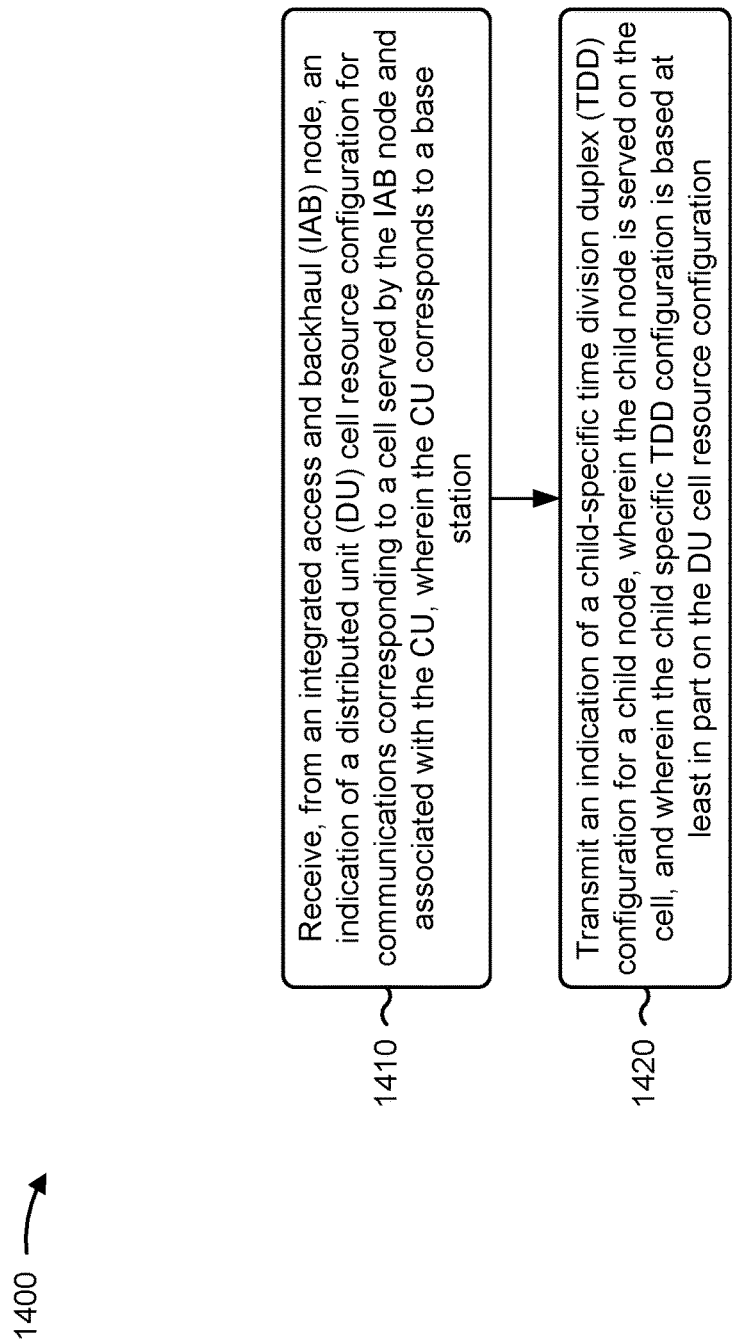

FIG. 14 is a diagram illustrating an example process 1400 performed, for example, by a CU, in accordance with the present disclosure. Example process 1400 is an example where the CU (e.g., the second CU 1015 shown in FIG. 10) performs operations associated with uplink and downlink configuration for IAB RAN sharing.

As shown in FIG. 14, in some aspects, process 1400 may include receiving, from an IAB node, an indication of a DU cell resource configuration for communications corresponding to a cell served by the IAB node and associated with the CU, wherein the CU corresponds to a base station (block 1410). For example, the CU (e.g., using reception component 1602, depicted in FIG. 16) may receive, from an IAB node, an indication of a DU cell resource configuration for communications corresponding to a cell served by the IAB node and associated with the CU, wherein the CU corresponds to a base station, as described above.

As further shown in FIG. 14, in some aspects, process 1400 may include transmitting an indication of a child-specific TDD configuration for a child node, wherein the child node is served on the cell, and wherein the child specific TDD configuration is based at least in part on the DU cell resource configuration (block 1420). For example, the cu (e.g., using transmission component 1604, depicted in FIG. 16) may transmit an indication of a child-specific TDD configuration for a child node, wherein the child node is served on the cell, and wherein the child specific TDD configuration is based at least in part on the DU cell resource configuration, as described above.

Process 1400 may include additional aspects, such as any single aspect or any combination of aspects described below and/or in connection with one or more other processes described elsewhere herein.

In a first aspect, the DU cell resource configuration indicates a direction of a communication resource of the cell.

In a second aspect, alone or in combination with the first aspect, process 1400 includes generating the child specific TDD configuration based at least in part on the DU cell resource configuration.

In a third aspect, alone or in combination with one or more of the first and second aspects, generating the child specific TDD configuration comprises generating the child specific TDD configuration so that a number of conflicts between the child specific TDD configuration and the DU cell resource configuration satisfies a criterion.

In a fourth aspect, alone or in combination with one or more of the first through third aspects, the DU cell resource configuration comprises a gNB-DU cell resource configuration.

In a fifth aspect, alone or in combination with one or more of the first through fourth aspects, the DU cell resource configuration comprises a downlink-uplink flexible configuration.

In a sixth aspect, alone or in combination with one or more of the first through fifth aspects, the indication of the DU cell resource configuration indicates a slot format for the DU cell resource configuration.

In a seventh aspect, alone or in combination with one or more of the first through sixth aspects, the indication of the DU cell resource configuration comprises an intended time division duplex downlink-uplink configuration.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
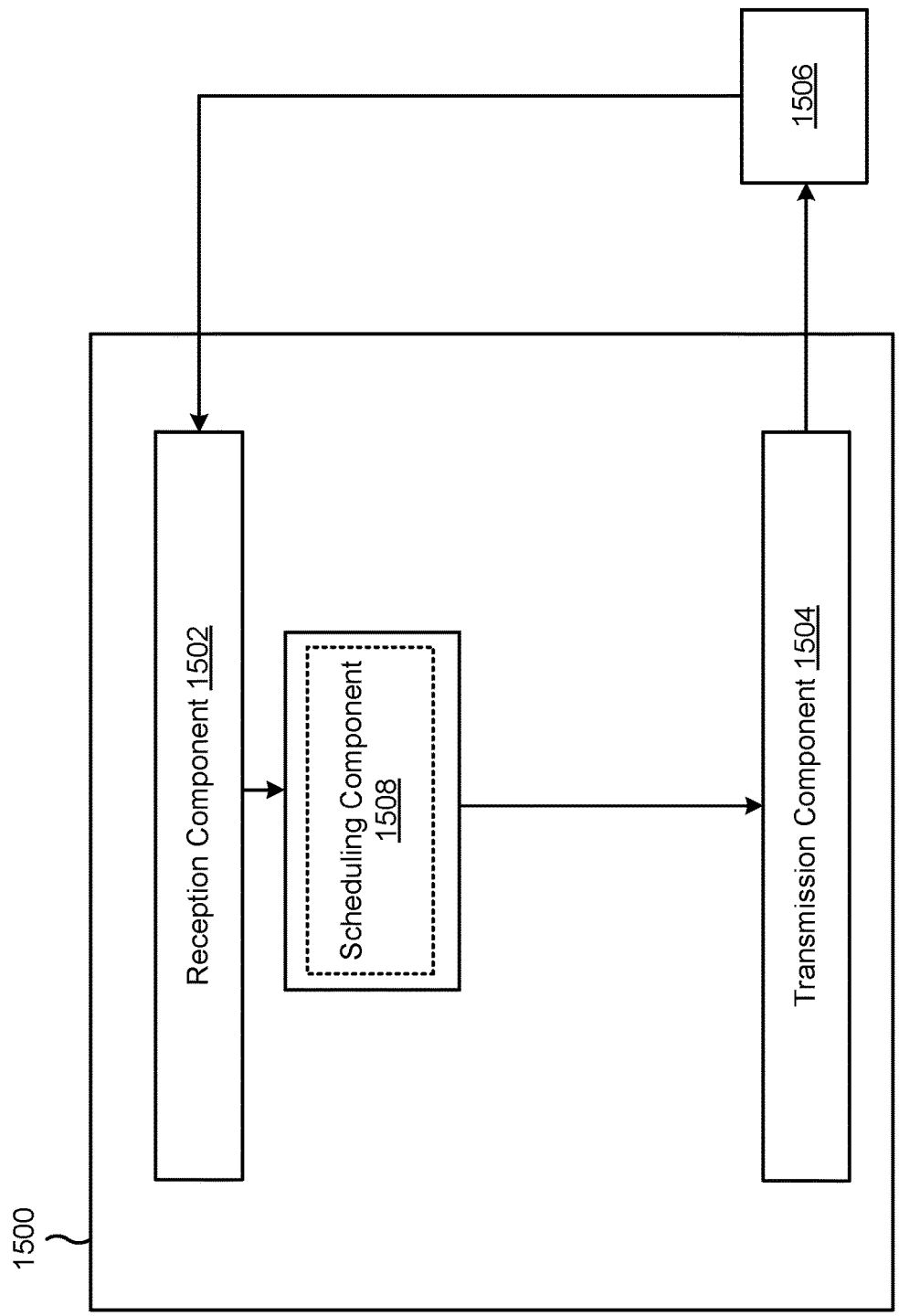
FIGS. 15 and 16 are block diagrams of example apparatuses for wireless communication, in accordance with the present disclosure.

FIG. 15 is a block diagram of an example apparatus 1500 for wireless communication. The apparatus 1500 may be a network node, or a network node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a scheduling component 1508, among other examples.

In some aspects, the apparatus 1500 may be configured to perform one or more operations described herein in connection with FIGS. 3-10. Additionally, or alternatively, the apparatus 1500 may be configured to perform one or more processes described herein, such as process 1100 of FIG. 11, process 1200 of FIG. 12, or a combination thereof. In some aspects, the apparatus 1500 and/or one or more components shown in FIG. 15 may include one or more components of the network node described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the network node described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the network node described above in connection with FIG. 2. In some aspects, the transmission component 1504 may be collocated with the reception component 1502 in a transceiver.

In some aspects, the scheduling component 1508, the transmission component 1504, and/or the reception component 1502 may communicate on the cell based at least in part on a cell resource configuration. In some aspects, the scheduling component 1508 may include one or more antennas, a demodulator, a MIMO detector, a receive processor, a modulator, a transmit MIMO processor, a transmit processor, a controller/processor, a memory, or a combination thereof, of the base station described above in connection with FIG. 2. In some aspects, the scheduling component 1508 may be associated with a DU.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
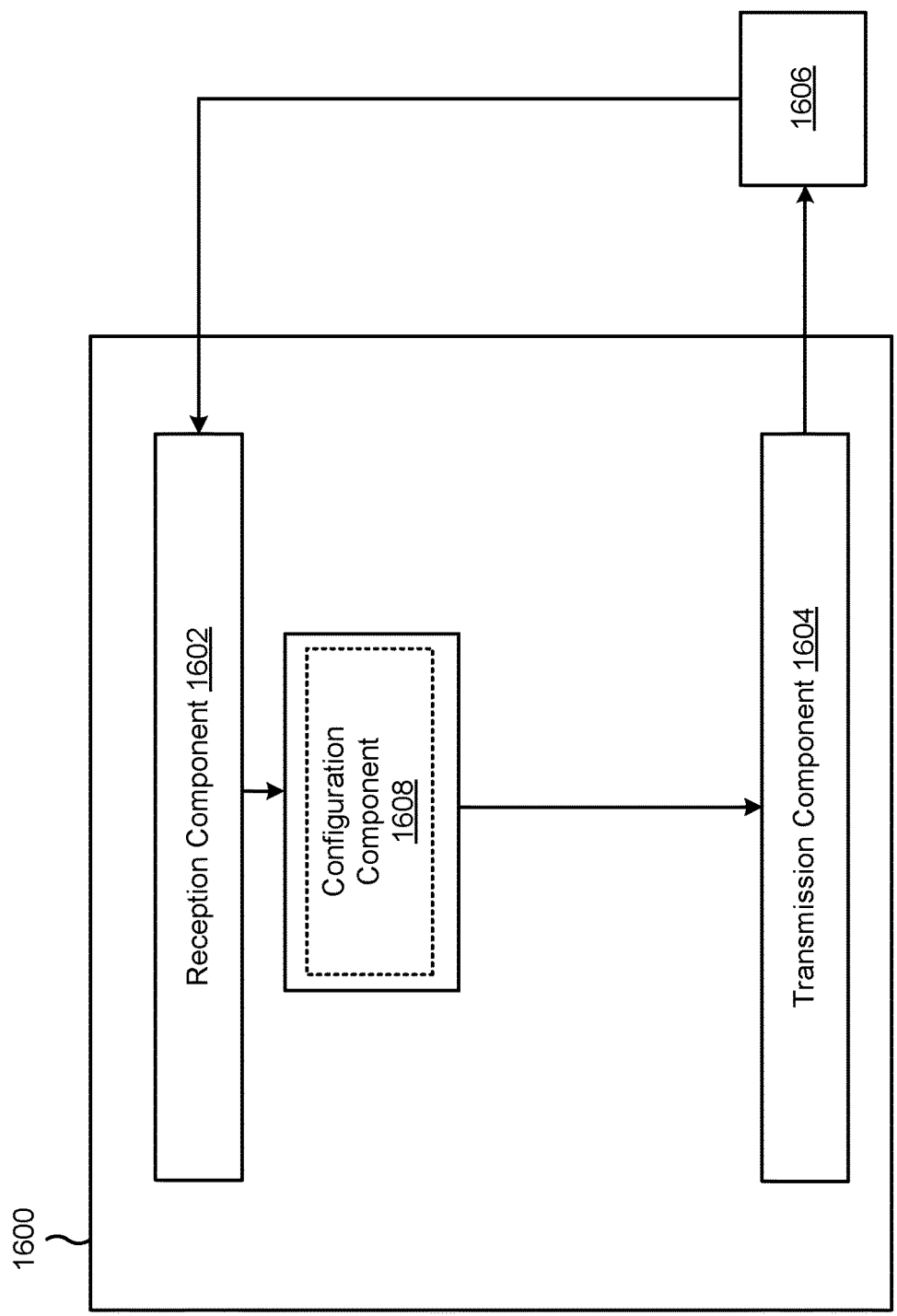

FIG. 16 is a block diagram of an example apparatus 1600 for wireless communication. The apparatus 1600 may be an IAB donor CU, or an IAB donor CU may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a configuration component 1608, among other examples. The configuration component 1608 may generate cell resource configurations.

In some aspects, the apparatus 1600 may be configured to perform one or more operations described herein in connection with FIGS. 3-10. Additionally, or alternatively, the apparatus 1600 may be configured to perform one or more processes described herein, such as process 1300 of FIG. 13, process 1400 of FIG. 14, or a combination thereof. In some aspects, the apparatus 1600 and/or one or more components shown in FIG. 16 may include one or more components of the IAB donor CU described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the base station described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the base station described above in connection with FIG. 2. In some aspects, the transmission component 1604 may be collocated with the reception component 1602 in a transceiver.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a network node, comprising: receiving, from a first central unit (CU) that corresponds to an integrated access and backhaul (IAB) donor, an indication of a first distributed unit (DU) cell resource configuration for communications corresponding to a cell served by the network node and associated with a second CU that corresponds to a base station; and transmitting, to the second CU, an indication of a second DU cell resource configuration based at least in part on the first DU cell resource configuration.

Aspect 2: The method of Aspect 1, further comprising generating the second DU cell resource configuration based at least in part on the first DU cell resource configuration.

Aspect 3: The method of either of Aspects 1 or 2, wherein the first DU cell resource configuration is specific to a child node served by the cell.

Aspect 4: The method of any of Aspects 1-3, wherein the second DU cell resource configuration is specific to a child node served by the cell.

Aspect 5: The method of any of Aspects 1-4, wherein the first CU is a first IAB donor CU and the second CU is a second IAB donor CU.

Aspect 6: The method of any of Aspects 1-5, wherein the first CU is associated with a first network and the second CU is associated with a second network.

Aspect 7: The method of any of Aspects 1-6, wherein the first CU is associated with resource management for an IAB network including the network node, and wherein traffic associated with the second CU is transported via the IAB network.

Aspect 8: The method of any of Aspects 1-7, wherein the indication of the first DU cell resource configuration is transported via a signaling connection between the first CU and the network node, and wherein the signaling connection is associated with at least one of: an F1 control protocol, or a radio resource control protocol.

Aspect 9: The method of any of Aspects 1-8, wherein a signaling connection between the second CU and the network node is associated with at least one of: an F1 control protocol, or a radio resource control protocol.

Aspect 10: The method of any of Aspects 1-9, further comprising: providing service to a child node of the network node, wherein the child node is associated with a radio resource control connection to the second CU.

Aspect 11: The method of Aspect 10, wherein the child node is a UE.

Aspect 12: The method of Aspect 10, wherein the child node is an IAB node.

Aspect 13: The method of any of Aspects 1-12, further comprising: providing service to a child node of the network node, wherein the child node is associated with a radio resource control connection to the first CU.

Aspect 14: The method of Aspect 13, wherein the child node is a UE.

Aspect 15: The method of Aspect 13, wherein the child node is an IAB node.

Aspect 16: The method of any of Aspects 1-15, wherein the cell operates according to a time division duplex (TDD) mode.

Aspect 17: The method of any of Aspects 1-16, wherein the cell operates according to a frequency division duplex (FDD) mode.

Aspect 18: The method of Aspect 17, wherein the first DU cell resource configuration comprises an uplink configuration and a downlink configuration.

Aspect 19: The method of any of Aspects 1-18, wherein the first DU cell resource configuration indicates availability of a communication resource of the cell.

Aspect 20: The method of any of Aspects 1-19, wherein the first DU cell resource configuration indicates a direction of a communication resource of the cell.

Aspect 21: The method of any of Aspects 1-20, wherein the first DU cell resource configuration indicates a cell direction of the cell.

Aspect 22: The method of any of Aspects 1-21, wherein the first DU cell resource configuration is defined at a per-slot granularity.

Aspect 23: The method of any of Aspects 1-22, wherein the first DU cell resource configuration is defined at a per-symbol granularity.

Aspect 24: The method of any of Aspects 1-23, wherein the first DU cell resource configuration is defined at a per-symbol-group granularity.

Aspect 25: The method of any of Aspects 1-24, wherein the first DU cell resource configuration is defined for a first carrier associated with the cell.

Aspect 26: The method of any of Aspects 1-25, wherein the first DU cell resource configuration is defined at a per-bandwidth-part granularity.

Aspect 27: The method of any of Aspects 1-26, wherein the first DU cell resource configuration is defined at a per-resource-block granularity or a per-resource-block-group granularity.

Aspect 28: The method of any of Aspects 1-27, wherein the first DU cell resource configuration is associated with a spatial region.

Aspect 29: The method of any of Aspects 1-28, wherein the second DU cell resource configuration comprises the first DU cell resource configuration.

Aspect 30: The method of any of Aspects 1-29, wherein the second DU cell resource configuration comprises a slot availability configuration associated with the first DU cell resource configuration.

Aspect 31: The method of any of Aspects 1-30, wherein the second DU cell resource configuration comprises a downlink-uplink flexible configuration associated with the first DU cell resource configuration.

Aspect 32: The method of any of Aspects 1-31, wherein the second DU cell resource configuration comprises a coarse version of the first DU cell resource configuration.

Aspect 33: The method of any of Aspects 1-32, wherein the indication of the second DU cell resource configuration indicates a slot format for the second DU cell resource configuration.

Aspect 34: The method of Aspect 33, wherein the indication of the second DU cell resource configuration indicates a symbol pattern associated with the slot format.

Aspect 35: The method of any of Aspects 1-34, wherein the indication of the second DU cell resource configuration comprises an intended time division duplex downlink-uplink configuration.

Aspect 36: The method of any of Aspects 1-35, further comprising: receiving, from the second CU, a child-specific time division duplex (TDD) configuration for a child node; and determining at least one conflict between the first DU cell resource configuration and the child-specific TDD configuration, wherein transmitting the indication of the second DU cell resource configuration comprises transmitting the indication of the second DU cell resource configuration based at least in part on determining the at least one conflict.

Aspect 37: The method of Aspect 36, wherein the second DU cell resource configuration comprises the child-specific TDD configuration.

Aspect 38: The method of any of Aspects 1-37, further comprising transmitting, to the second CU, an indication to stop generating child-specific time division duplex configurations for child nodes served on the cell.

Aspect 39: The method of any of Aspects 1-38, wherein the second DU cell resource configuration is to cause the second CU to generate a child-specific time division duplex (TDD) configuration for a child node served on the cell, wherein the child-specific TDD configuration does not conflict with the first DU cell resource configuration.

Aspect 40: The method of any of Aspects 1-39, further comprising generating, based at least in part on the first DU cell resource configuration, a cell-specific time division duplex (TDD) configuration for uplink and downlink communications associated with the cell.

Aspect 41: The method of Aspect 40, wherein the first DU cell resource configuration overwrites a flexible time resource associated with a prior cell-specific TDD configuration for uplink and downlink communications associated with the cell.

Aspect 42: The method of Aspect 40, wherein the second DU cell resource configuration comprises the cell-specific TDD configuration.

Aspect 43: The method of Aspect 40, wherein the second DU cell resource configuration is to cause the second CU to generate a child-specific TDD configuration for a child node served on the cell, wherein the child-specific TDD configuration complies with the cell-specific TDD configuration.

Aspect 44: A method of wireless communication performed by a central unit (CU), comprising: receiving, from an integrated access and backhaul (IAB) node, an indication of a distributed unit (DU) cell resource configuration for communications corresponding to a cell served by the IAB node and associated with the CU, wherein the CU corresponds to a base station; and transmitting an indication of a child-specific time division duplex (TDD) configuration for a child node, wherein the child node is served on the cell, and wherein the child specific TDD configuration is based at least in part on the DU cell resource configuration.

Aspect 45: The method of Aspect 44, wherein the DU cell resource configuration indicates a direction of a communication resource of the cell.

Aspect 46: The method of either of Aspects 44 or 45, further comprising generating the child specific TDD configuration based at least in part on the DU cell resource configuration.

Aspect 47: The method of Aspect 46, wherein generating the child specific TDD configuration comprises generating the child specific TDD configuration so that a number of conflicts between the child specific TDD configuration and the DU cell resource configuration satisfies a criterion.

Aspect 48: The method of any of Aspects 44-47, wherein the DU cell resource configuration comprises a gNB-DU cell resource configuration.

Aspect 49: The method of any of Aspects 44-48, wherein the DU cell resource configuration comprises a downlink-uplink flexible configuration.

Aspect 50: The method of any of Aspects 44-49, wherein the indication of the DU cell resource configuration indicates a slot format for the DU cell resource configuration.

Aspect 51: The method of any of Aspects 44-50, wherein the indication of the DU cell resource configuration comprises an intended time division duplex downlink-uplink configuration.

Aspect 52: A method of wireless communication performed by a network node, comprising: transmitting, to a first central unit (CU) that corresponds to an integrated access and backhaul (IAB) donor, an indication of a first resource configuration for communications corresponding to a cell served by the network node and associated with a second CU that corresponds to a base station; and receiving, from the first CU, a second resource configuration comprising a distributed unit (DU) cell resource configuration for the cell.

Aspect 53: The method of Aspect 52, wherein the first resource configuration is specific to a child node served by the cell.

Aspect 54: The method of either of Aspects 52 or 53, wherein the DU cell resource configuration is specific to a child node served by the cell.

Aspect 55: The method of any of Aspects 52-54, wherein the first CU is a first IAB donor CU and the second CU is a second IAB donor CU.

Aspect 56: The method of any of Aspects 52-55, wherein the first CU is associated with a first network and the second CU is associated with a second network.

Aspect 57: The method of any of Aspects 52-56, wherein the first CU is associated with resource management for an IAB network including the network node, and wherein traffic associated with the second CU is transported via the IAB network.

Aspect 58: The method of any of Aspects 52-57, wherein the indication of the first resource configuration is transported via a signaling connection between the first CU and the network node, and wherein the signaling connection is associated with at least one of: an F1 control protocol, or a radio resource control protocol.

Aspect 59: The method of any of Aspects 52-58, wherein a signaling connection between the second CU and the network node is associated with at least one of: an F1 control protocol, or a radio resource control protocol.

Aspect 60: The method of any of Aspects 52-59, further comprising: providing service to a child node of the network node, wherein the child node is associated with a radio resource control connection to the second CU.

Aspect 61: The method of Aspect 60, wherein the child node is a UE.

Aspect 62: The method of either of Aspects 60 or 61, wherein the child node is an IAB node.

Aspect 63: The method of any of Aspects 52-62, wherein the cell is associated with a cell identifier that identifies the base station.

Aspect 64: The method of any of Aspects 52-63, wherein the cell is associated with a cell identifier that identifies the IAB donor, and wherein the cell is deactivated by the first CU or is barred for access by child nodes that select a network associated with the first CU.

Aspect 65: The method of any of Aspects 52-64, wherein the cell operates according to a time division duplex (TDD) mode.

Aspect 66: The method of any of Aspects 52-65, wherein the cell operates according to a frequency division duplex (FDD) mode.

Aspect 67: The method of Aspect 66, wherein the DU cell resource configuration comprises an uplink configuration and a downlink configuration.

Aspect 68: The method of any of Aspects 52-67, wherein the first resource configuration indicates at least one of: a time resource, a frequency resource, or a spatial resource.

Aspect 69: The method of any of Aspects 52-68, wherein the second resource configuration indicates at least one of: a time resource, a frequency resource, or a spatial resource.

Aspect 70: The method of any of Aspects 52-69, wherein the first resource configuration comprises a cell-specific time division duplex uplink and downlink configuration.

Aspect 71: The method of any of Aspects 52-70, wherein the first resource configuration comprises an intended cell-specific time division duplex (TDD) uplink and downlink configuration, wherein the intended cell-specific TDD uplink and downlink configuration comprises a repurposed format associated with cross-link interference mitigation.

Aspect 72: The method of any of Aspects 52-71, further comprising transmitting, to the first CU, at least a portion of a system information block 1 (SIB1) message associated with the cell.

Aspect 73: The method of any of Aspects 52-72, further comprising: receiving, from the second CU, a child-specific time division duplex (TDD) uplink and downlink configuration associated with a child node served on the cell; and forwarding the child-specific TDD uplink and downlink configuration to the first CU, wherein the second resource configuration is based at least in part on the child-specific TDD uplink and downlink configuration.

Aspect 74: The method of any of Aspects 52-73, wherein the second resource configuration is based at least in part on a downlink-uplink flexible (DUF) configuration having a conflict level with one or more non-flexible resources of the first resource configuration that satisfies a conflict criterion.

Aspect 75: The method of any of Aspects 52-74, wherein the second resource configuration is based at least in part on an indication of availability of one or more resources for at least one communication associated with the second CU.

Aspect 76: The method of Aspect 75, wherein the at least one communication associated with the second CU comprises at least one of: a synchronization signal block transmission, a channel state information reference signal transmission, scheduling request configuration, a system information block 1 physical random access channel configuration, or a physical downlink control channel configuration.

Aspect 77: The method of any of Aspects 52-76, further comprising transmitting a suggested downlink-uplink flexible (DUF) configuration to the first CU, wherein the second resource configuration is based at least in part on the suggested DUF configuration.

Aspect 78: The method of any of Aspects 52-77, further comprising: transmitting an indication of one or more conflicts between the second resource configuration and a third resource configuration associated with the cell; and receiving a modified second resource configuration, wherein the modified second resource configuration is based at least in part on the indication of the one or more conflicts.

Aspect 79: The method of any of Aspects 52-78, further comprising transmitting a suggested availability indication configuration to the first CU, wherein the second resource configuration is based at least in part on the suggested availability indication configuration.

Aspect 80: The method of any of Aspects 52-79, further comprising: transmitting an indication of one or more conflicts between the second resource configuration and a third resource configuration associated with the second CU, wherein the third resource configuration corresponds to at least one communication associated with the cell; and receiving a modified second resource configuration, wherein the modified second resource configuration is based at least in part on the indication of the one or more conflicts.

Aspect 81: The method of Aspect 80, wherein the at least one communication associated with the cell comprises at least one of: a synchronization signal block transmission, a channel state information reference signal transmission, scheduling request configuration, a system information block 1 physical random access channel configuration, or a physical downlink control channel configuration.

Aspect 82: A method of wireless communication performed by a first central unit (CU) associated with an integrated access and backhaul (IAB) donor, comprising: receiving, from an IAB node, an indication of a first resource configuration for communications corresponding to a cell served by the IAB node and associated with a second CU that corresponds to a base station; and transmitting, to the IAB node, a second resource configuration comprising a distributed unit (DU) cell resource configuration for the cell.

Aspect 83: The method of Aspect 82, further comprising generating the second resource configuration.

Aspect 84: The method of either of Aspects 82 or 83, wherein the first resource configuration is specific to a child node served by the cell.

Aspect 85: The method of any of Aspects 82-84, wherein the DU cell resource configuration is specific to a child node served by the cell.

Aspect 86: The method of any of Aspects 82-85, wherein the first CU is a first IAB donor CU and the second CU is a second IAB donor CU.

Aspect 87: The method of any of Aspects 82-86, wherein the first CU is associated with a first network and the second CU is associated with a second network.

Aspect 88: The method of any of Aspects 82-87, wherein the first CU is associated with resource management for an IAB network including the IAB node, and wherein traffic associated with the second CU is transported via the IAB network.

Aspect 89: The method of any of Aspects 82-88, wherein the indication of the first resource configuration is transported via a signaling connection between the first CU and the IAB node, and wherein the signaling connection is associated with at least one of: an F1 control protocol, or a radio resource control protocol.

Aspect 90: The method of any of Aspects 82-89, wherein a signaling connection between the second CU and the IAB node is associated with at least one of: an F1 control protocol, or a radio resource control protocol.

Aspect 91: The method of any of Aspects 82-90, wherein the cell is associated with a cell identifier that identifies the base station.

Aspect 92: The method of any of Aspects 82-91, wherein the cell is associated with a cell identifier that identifies the IAB donor, and wherein the cell is deactivated by the first CU or is barred for access by child nodes that select a network associated with the first CU.

Aspect 93: The method of any of Aspects 82-92, wherein the cell operates according to a time division duplex (TDD) mode.

Aspect 94: The method of any of Aspects 82-93, wherein the cell operates according to a frequency division duplex (FDD) mode.

Aspect 95: The method of any of Aspects 82-94, wherein the DU cell resource configuration comprises an uplink configuration and a downlink configuration.

Aspect 96: The method of any of Aspects 82-95, wherein the first resource configuration indicates at least one of: a time resource, a frequency resource, or a spatial resource.

Aspect 97: The method of any of Aspects 82-96, wherein the second resource configuration indicates at least one of: a time resource, a frequency resource, or a spatial resource.

Aspect 98: The method of any of Aspects 82-97, wherein the first resource configuration comprises a cell-specific time division duplex uplink and downlink configuration.

Aspect 99: The method of any of Aspects 82-98, wherein the first resource configuration comprises an intended cell-specific time division duplex (TDD) uplink and downlink configuration, wherein the intended cell-specific TDD uplink and downlink configuration comprises a repurposed format associated with cross-link interference mitigation.

Aspect 100: The method of any of Aspects 82-99, further comprising receiving, from the IAB node, at least a portion of a system information block 1 (SIB1) message associated with the cell.

Aspect 101: The method of any of Aspects 82-100, further comprising: receiving, from the IAB node, a forwarded configuration from the second CU, wherein the forwarded configuration comprises a child-specific time division duplex (TDD) uplink and downlink configuration associated with a child node served on the cell; and generating the second resource configuration based at least in part on the child-specific TDD uplink and downlink configuration.

Aspect 102: The method of any of Aspects 82-101, further comprising generating the second resource configuration based at least in part on a downlink-uplink flexible (DUF) configuration having a conflict level with one or more non-flexible resources of the first resource configuration that satisfies a conflict criterion.

Aspect 103: The method of any of Aspects 82-102, further comprising generating the second resource configuration based at least in part on an indication of availability of one or more resources for at least one communication associated with the second CU.

Aspect 104: The method of Aspect 103, wherein the at least one communication associated with the second CU comprises at least one of: a synchronization signal block transmission, a channel state information reference signal transmission, scheduling request configuration, a system information block 1 physical random access channel configuration, or a physical downlink control channel configuration.

Aspect 105: The method of any of Aspects 82-104, further comprising: receiving, from the IAB node, a suggested downlink-uplink flexible (DUF) configuration; and generating the second resource configuration based at least in part on the suggested DUF configuration.

Aspect 106: The method of any of Aspects 82-105, further comprising: receiving an indication of one or more conflicts between the second resource configuration and a third resource configuration associated with the cell; generating a modified second resource configuration based at least in part on the indication of the one or more conflicts; and transmitting the modified second resource configuration.

Aspect 107: The method of any of Aspects 82-106, further comprising: receiving a suggested availability indication configuration from the IAB node; and generating the second resource configuration based at least in part on the suggested availability indication configuration.

Aspect 108: The method of any of Aspects 82-107, further comprising: receiving an indication of one or more conflicts between the second resource configuration and a third resource configuration associated with the second CU, wherein the third resource configuration corresponds to at least one communication associated with the cell; generating a modified second resource configuration based at least in part on the indication of the one or more conflicts; and transmitting the modified second resource configuration.

Aspect 109: The method of Aspect 108, wherein the at least one communication associated with the cell comprises at least one of: a synchronization signal block transmission, a channel state information reference signal transmission, scheduling request configuration, a system information block 1 physical random access channel configuration, or a physical downlink control channel configuration.

Aspect 110: A method of wireless communication performed by a network node, comprising: transmitting, to a first central unit (CU) that corresponds to an integrated access and backhaul (IAB) donor, an indication of a first resource configuration for communications corresponding to a cell served by the network node and associated with a second CU that corresponds to a base station; receiving, from the first CU, a second resource configuration comprising a distributed unit (DU) cell resource configuration for the cell.

Aspect 111: The method of Aspect 110, wherein at least one of the first resource configuration or the DU cell resource configuration is specific to a child node served by the cell.

Aspect 112: The method of either of Aspects 110 or 111, wherein the first CU is associated with a first network and the second CU is associated with a second network.

Aspect 113: The method of any of Aspects 110-112, wherein the first CU is associated with resource management for an IAB network including the network node, and wherein traffic associated with the second CU is transported via the IAB network.

Aspect 114: The method of any of Aspects 110-113, wherein the cell is associated with a cell identifier that identifies the base station.

Aspect 115: The method of any of Aspects 110-114, wherein at least one of the first resource configuration or the second resource configuration indicates at least one of a time resource, a frequency resource, or a spatial resource.

Aspect 116: The method of any of Aspects 110-115, wherein the first resource configuration comprises a cell-specific time division duplex uplink and downlink configuration.

Aspect 117: The method of any of Aspects 110-116, wherein the first resource configuration comprises an intended cell-specific time division duplex (TDD) uplink and downlink configuration, wherein the intended cell-specific TDD uplink and downlink configuration comprises a repurposed format associated with cross-link interference mitigation.

Aspect 118: The method of any of Aspects 110-117, further comprising transmitting, to the first CU, at least a portion of a system information block 1 (SIB1) message associated with the cell.

Aspect 119: The method of any of Aspects 110-118, further comprising: receiving, from the second CU, a child-specific time division duplex (TDD) uplink and downlink configuration associated with a child node served on the cell; and forwarding the child-specific TDD uplink and downlink configuration to the first CU, wherein the second resource configuration is based at least in part on the child-specific TDD uplink and downlink configuration.

Aspect 120: The method of any of Aspects 110-119, wherein the second resource configuration is based at least in part on a downlink-uplink flexible (DUF) configuration having a conflict level with one or more non-flexible resources of the first resource configuration that satisfies a conflict criterion.

Aspect 121: The method of any of Aspects 110-120, wherein the second resource configuration is based at least in part on an indication of availability of one or more resources for at least one communication associated with the second CU.

Aspect 122: The method of any of Aspects 110-121, further comprising: transmitting a suggested downlink-uplink flexible (DUF) configuration to the first CU, wherein the second resource configuration is based at least in part on the suggested DUF configuration; and transmitting a suggested availability indication configuration to the first CU, wherein the second resource configuration is based at least in part on the suggested availability indication configuration.

Aspect 123: The method of any of Aspects 110-122, further comprising: transmitting an indication of one or more conflicts between the second resource configuration and a third resource configuration associated with at least one of the cell or the second CU; and receiving a modified second resource configuration, wherein the modified second resource configuration is based at least in part on the indication of the one or more conflicts.

Aspect 124: The method of any of Aspects 110-123, further comprising transmitting, to the second CU, an indication of a third DU cell resource configuration based at least in part on the second DU cell resource configuration.

Aspect 125: The method of Aspect 124, wherein the third DU cell resource configuration comprises at least a portion of the second DU cell resource configuration.

Aspect 126: The method of either of Aspects 124 or 125, further comprising: receiving, from the second CU, a child-specific time division duplex (TDD) configuration for a child node; and determining at least one conflict between the second DU cell resource configuration and the child-specific TDD configuration, wherein transmitting the indication of the third DU cell resource configuration comprises transmitting the indication of the third DU cell resource configuration based at least in part on determining the at least one conflict.

Aspect 127: The method of Aspect 126, wherein the third DU cell resource configuration comprises the child-specific TDD configuration.

Aspect 128: The method of any of Aspects 124-127, further comprising generating, based at least in part on the second DU cell resource configuration, a cell-specific time division duplex (TDD) configuration for uplink and downlink communications associated with the cell.

Aspect 129: The method of Aspect 128, wherein the third DU cell resource configuration comprises the cell-specific TDD configuration.

Aspect 130: A method of wireless communication performed by a first central unit (CU) associated with an integrated access and backhaul (IAB) donor, comprising: receiving, from an IAB node, an indication of a first resource configuration for communications corresponding to a cell served by the IAB node and associated with a second CU that corresponds to a base station; and transmitting, to the IAB node, a second resource configuration comprising a distributed unit (DU) cell resource configuration for the cell.

Aspect 131: The method of Aspect 130, further comprising generating the second resource configuration.

Aspect 132: The method of either of Aspects 130 or 131, wherein at least one of the first resource configuration or the DU cell resource configuration is specific to a child node served by the cell.

Aspect 133: The method of any of Aspects 130-132, wherein the first CU is associated with a first network and the second CU is associated with a second network.

Aspect 134: The method of any of Aspects 130-133, wherein the first CU is associated with resource management for an IAB network including the IAB node, and wherein traffic associated with the second CU is transported via the IAB network.

Aspect 135: The method of any of Aspects 130-134, wherein the cell is associated with a cell identifier that identifies the base station.

Aspect 136: The method of any of Aspects 130-135, wherein at least one of the first resource configuration or the second resource configuration indicates at least one of: a time resource, a frequency resource, or a spatial resource.

Aspect 137: The method of any of Aspects 130-136, wherein the first resource configuration comprises a cell-specific time division duplex uplink and downlink configuration.

Aspect 138: An apparatus for wireless communication at a device, comprising a processor; memory coupled with the processor; and instructions stored in the memory and executable by the processor to cause the apparatus to perform the method of one or more of Aspects 1-43.

Aspect 139: A device for wireless communication, comprising a memory and one or more processors coupled to the memory, the one or more processors configured to perform the method of one or more of Aspects 1-43.

Aspect 140: An apparatus for wireless communication, comprising at least one means for performing the method of one or more of Aspects 1-43.

Aspect 141: A non-transitory computer-readable medium storing code for wireless communication, the code comprising instructions executable by a processor to perform the method of one or more of Aspects 1-43.

Aspect 142: A non-transitory computer-readable medium storing a set of instructions for wireless communication, the set of instructions comprising one or more instructions that, when executed by one or more processors of a device, cause the device to perform the method of one or more of Aspects 1-43.

Aspect 143: An apparatus for wireless communication at a device, comprising a processor; memory coupled with the processor; and instructions stored in the memory and executable by the processor to cause the apparatus to perform the method of one or more of Aspects 44-51.

Aspect 144: A device for wireless communication, comprising a memory and one or more processors coupled to the memory, the one or more processors configured to perform the method of one or more of Aspects 44-51.

Aspect 145: An apparatus for wireless communication, comprising at least one means for performing the method of one or more of Aspects 44-51.

Aspect 146: A non-transitory computer-readable medium storing code for wireless communication, the code comprising instructions executable by a processor to perform the method of one or more of Aspects 44-51.

Aspect 147: A non-transitory computer-readable medium storing a set of instructions for wireless communication, the set of instructions comprising one or more instructions that, when executed by one or more processors of a device, cause the device to perform the method of one or more of Aspects 44-51.

Aspect 148: An apparatus for wireless communication at a device, comprising a processor; memory coupled with the processor; and instructions stored in the memory and executable by the processor to cause the apparatus to perform the method of one or more of Aspects 52-81.

Aspect 149: A device for wireless communication, comprising a memory and one or more processors coupled to the memory, the one or more processors configured to perform the method of one or more of Aspects 52-81.

Aspect 150: An apparatus for wireless communication, comprising at least one means for performing the method of one or more of Aspects 52-81.

Aspect 151: A non-transitory computer-readable medium storing code for wireless communication, the code comprising instructions executable by a processor to perform the method of one or more of Aspects 52-81.

Aspect 152: A non-transitory computer-readable medium storing a set of instructions for wireless communication, the set of instructions comprising one or more instructions that, when executed by one or more processors of a device, cause the device to perform the method of one or more of Aspects 52-81.

Aspect 153: An apparatus for wireless communication at a device, comprising a processor; memory coupled with the processor; and instructions stored in the memory and executable by the processor to cause the apparatus to perform the method of one or more of Aspects 82-109.

Aspect 154: A device for wireless communication, comprising a memory and one or more processors coupled to the memory, the one or more processors configured to perform the method of one or more of Aspects 82-109.

Aspect 155: An apparatus for wireless communication, comprising at least one means for performing the method of one or more of Aspects 82-109.

Aspect 156: A non-transitory computer-readable medium storing code for wireless communication, the code comprising instructions executable by a processor to perform the method of one or more of Aspects 82-109.

Aspect 157: A non-transitory computer-readable medium storing a set of instructions for wireless communication, the set of instructions comprising one or more instructions that, when executed by one or more processors of a device, cause the device to perform the method of one or more of Aspects 82-109.

Aspect 158: An apparatus for wireless communication at a device, comprising a processor; memory coupled with the processor; and instructions stored in the memory and executable by the processor to cause the apparatus to perform the method of one or more of Aspects 110-129.

Aspect 159: A device for wireless communication, comprising a memory and one or more processors coupled to the memory, the one or more processors configured to perform the method of one or more of Aspects 110-129.

Aspect 160: An apparatus for wireless communication, comprising at least one means for performing the method of one or more of Aspects 110-129.

Aspect 161: A non-transitory computer-readable medium storing code for wireless communication, the code comprising instructions executable by a processor to perform the method of one or more of Aspects 110-129.

Aspect 162: A non-transitory computer-readable medium storing a set of instructions for wireless communication, the set of instructions comprising one or more instructions that, when executed by one or more processors of a device, cause the device to perform the method of one or more of Aspects 110-129.

Aspect 163: An apparatus for wireless communication at a device, comprising a processor; memory coupled with the processor; and instructions stored in the memory and executable by the processor to cause the apparatus to perform the method of one or more of Aspects 130-137.

Aspect 164: A device for wireless communication, comprising a memory and one or more processors coupled to the memory, the one or more processors configured to perform the method of one or more of Aspects 130-137.

Aspect 165: An apparatus for wireless communication, comprising at least one means for performing the method of one or more of Aspects 130-137.

Aspect 166: A non-transitory computer-readable medium storing code for wireless communication, the code comprising instructions executable by a processor to perform the method of one or more of Aspects 130-137.

Aspect 167: A non-transitory computer-readable medium storing a set of instructions for wireless communication, the set of instructions comprising one or more instructions that, when executed by one or more processors of a device, cause the device to perform the method of one or more of Aspects 130-137.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
   a memory; and
   one or more processors, coupled to the memory, configured to:
      transmit, to a first central unit (CU) that corresponds to an integrated access and backhaul (IAB) donor, an indication of a first resource configuration for communications corresponding to a cell served by the network node, the first resource configuration being configured by a second CU that corresponds to a base station; and
      receive, from the first CU, a second resource configuration for communications corresponding to the cell, the second resource configuration being configured in accordance with the first resource configuration, and the second resource configuration comprising a distributed unit (DU) cell resource configuration for the cell.

2. The network node of claim 1, wherein at least one of the first resource configuration or the DU cell resource configuration is specific to a child node served by the cell.

3. The network node of claim 1, wherein the first CU is associated with a first network and the second CU is associated with a second network.

4. The network node of claim 1, wherein the first CU is associated with resource management for an IAB network including the network node, and wherein traffic associated with the second CU is transported via the IAB network.

5. The network node of claim 1, wherein the cell is associated with a cell identifier that identifies the base station.

6. The network node of claim 1, wherein at least one of the first resource configuration or the second resource configuration indicates at least one of a time resource, a frequency resource, or a spatial resource.

7. The network node of claim 1, wherein the first resource configuration comprises a cell-specific time division duplex uplink and downlink configuration.

8. The network node of claim 1, wherein the first resource configuration comprises an intended cell-specific time division duplex (TDD) uplink and downlink configuration, wherein the intended cell-specific TDD uplink and downlink configuration comprises a repurposed format associated with cross-link interference mitigation.

9. The network node of claim 1, wherein the one or more processors are further configured to transmit, to the first CU, at least a portion of a system information block 1 (SIB1) message associated with the cell.

10. The network node of claim 1, wherein the one or more processors are further configured to:
   receive, from the second CU, a child-specific time division duplex (TDD) uplink and downlink configuration associated with a child node served on the cell; and
   forward the child-specific TDD uplink and downlink configuration to the first CU,
      wherein the second resource configuration is based at least in part on the child-specific TDD uplink and downlink configuration.

11. The network node of claim 1, wherein the second resource configuration is based at least in part on a downlink-uplink flexible (DUF) configuration having a conflict level with one or more non-flexible resources of the first resource configuration that satisfies a conflict criterion.

12. The network node of claim 1, wherein the second resource configuration is based at least in part on an indication of availability of one or more resources for at least one communication associated with the second CU.

13. The network node of claim 1, wherein the one or more processors are further configured to:
   transmit a suggested downlink-uplink flexible (DUF) configuration to the first CU, wherein the second resource configuration is based at least in part on the suggested DUF configuration, or
   transmit a suggested availability indication configuration to the first CU, wherein the second resource configuration is based at least in part on the suggested availability indication configuration.

14. The network node of claim 1, wherein the one or more processors are further configured to:
   transmit an indication of one or more conflicts between the second resource configuration and a third resource configuration associated with at least one of the cell or the second CU; and
   receive a modified second resource configuration, wherein the modified second resource configuration is based at least in part on the indication of the one or more conflicts.

15. The network node of claim 1, wherein the one or more processors are further configured to transmit, to the second CU, an indication of a third DU cell resource configuration based at least in part on the DU cell resource configuration.

16. The network node of claim 15, wherein the third DU cell resource configuration comprises at least a portion of the DU cell resource configuration.

17. The network node of claim 15, wherein the one or more processors are further configured to:
   receive, from the second CU, a child-specific time division duplex (TDD) configuration for a child node; and
   determine at least one conflict between the DU cell resource configuration and the child-specific TDD configuration,
      wherein the one or more processors, to transmit the indication of the third DU cell resource configuration, are configured to transmit the indication of the third DU cell resource configuration based at least in part on determining the at least one conflict.

18. The network node of claim 17, wherein the third DU cell resource configuration comprises the child-specific TDD configuration.

19. The network node of claim 15, wherein the one or more processors are further configured to generate, based at least in part on the DU cell resource configuration, a cell-specific time division duplex (TDD) configuration for uplink and downlink communications associated with the cell.

20. The network node of claim 19, wherein the third DU cell resource configuration comprises the cell-specific TDD configuration.

21. A first central unit (CU) for wireless communication, comprising:
   a memory; and one or more processors, coupled to the memory, configured to:
receive, from an integrated access-backhaul (IAB) node, an indication of a first resource configuration for communications corresponding to a cell served by the IAB node, the first resource configuration being configured by a second CU that corresponds to a base station; and
transmit, to the IAB node, a second resource configuration for communications corresponding to the cell, the second resource configuration being configured in accordance with the first resource configuration, and the second resource configuration comprising a distributed unit (DU) cell resource configuration for the cell.

22. The first CU of claim 21, wherein the one or more processors are further configured to generate the second resource configuration.

23. The first CU of claim 21, wherein at least one of the first resource configuration or the DU cell resource configuration is specific to a child node served by the cell.

24. The first CU of claim 21, wherein the first CU is associated with a first network and the second CU is associated with a second network.

25. The first CU of claim 21, wherein the first CU is associated with resource management for an IAB network including the IAB node, and wherein traffic associated with the second CU is transported via the IAB network.

26. The first CU of claim 21, wherein the cell is associated with a cell identifier that identifies the base station.

27. The first CU of claim 21, wherein at least one of the first resource configuration or the second resource configuration indicates at least one of:
a time resource,
a frequency resource, or
a spatial resource.

28. The first CU of claim 21, wherein the first resource configuration comprises a cell-specific time division duplex uplink and downlink configuration.

29. A method of wireless communication performed by a network node, comprising:
transmitting, to a first central unit (CU) that corresponds to an integrated access and backhaul (IAB) donor, an indication of a first resource configuration for communications corresponding to a cell served by the network node, the first resource configuration being configured by a second CU that corresponds to a base station; and
receiving, from the first CU, a second resource configuration for communications corresponding to the cell, the second resource configuration being configured in accordance with the first resource configuration, and the second resource configuration comprising a distributed unit (DU) cell resource configuration for the cell.

30. A method of wireless communication performed by a first central unit (CU) associated with an integrated access and backhaul (IAB) donor, comprising:
receiving, from an IAB node, an indication of a first resource configuration for communications corresponding to a cell served by the IAB node, the first resource configuration being configured by a second CU that corresponds to a base station; and
transmitting, to the IAB node, a second resource configuration for communications corresponding to the cell, the second resource configuration being configured in accordance with the first resource configuration, and the second resource configuration comprising a distributed unit (DU) cell resource configuration for the cell.

* * * * *